(12) United States Patent
Kubo

(10) Patent No.: US 12,078,904 B2
(45) Date of Patent: Sep. 3, 2024

(54) ELECTROCHROMIC DEVICE, OPTICAL FILTER, LENS UNIT, IMAGE PICKUP APPARATUS, WINDOW MEMBER, AND ELECTROCHROMIC MIRROR

(71) Applicant: CANON KABUSHIKI KAISHA, Tokyo (JP)

(72) Inventor: Wataru Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 17/552,046

(22) Filed: Dec. 15, 2021

(65) Prior Publication Data

US 2022/0197098 A1 Jun. 23, 2022

(30) Foreign Application Priority Data

Dec. 22, 2020 (JP) .................................. 2020-212459
Oct. 26, 2021 (JP) .................................. 2021-174640

(51) Int. Cl.
*G02F 1/1514* (2019.01)
*H04N 23/84* (2023.01)
*H04N 25/11* (2023.01)

(52) U.S. Cl.
CPC ........... *G02F 1/1514* (2019.01); *H04N 23/84* (2023.01); *H04N 25/11* (2023.01); *G02F 2001/15145* (2019.01)

(58) Field of Classification Search
CPC ......... G02F 1/1514; G02F 2001/15145; G02F 1/157; H04N 23/84; H04N 25/11
See application file for complete search history.

(56) References Cited

U.S. PATENT DOCUMENTS 10,444,588 B2 * 10/2019 Yamada .................... C09K 9/02
11,630,364 B2 * 4/2023 Kubo .................... G02F 1/1514
359/265

FOREIGN PATENT DOCUMENTS

| JP | 3798980 B2 | 7/2006 |
| JP | 2016155802 A | 9/2016 |
| JP | 2017021327 A | 1/2017 |
| WO | 2020121845 A1 | 6/2020 |

* cited by examiner

*Primary Examiner* — Seung C Sohn
(74) *Attorney, Agent, or Firm* — Canon U.S.A., Inc. I.P. Division

(57) ABSTRACT

The types and concentrations of multiple anodic electrochromic compounds are selected in such a manner that $RG_{max}$ is 1.37 or less, in which $RG_{max}$ is a maximum value among ratios between RGB signal ratios in the transmission state of an electrochromic device and in colored states of the anodic electrochromic compounds, the RGB signal ratios are obtained from $T_A(\lambda)$ and the sensitivity of a photodetector, and $T_A(\lambda)$ is a normalized variable transmittance obtained by a combination of absorptions of the anodic electrochromic compounds.

19 Claims, 11 Drawing Sheets

ELECTROCHROMIC DEVICE, OPTICAL FILTER, LENS UNIT, IMAGE PICKUP APPARATUS, WINDOW MEMBER, AND ELECTROCHROMIC MIRROR

BACKGROUND OF THE INVENTION

Field of the Invention

The present disclosure relates to an electrochromic device and an optical apparatus including the electrochromic device.

Description of the Related Art

Variable-light-transmittance devices, which are light transmittance-reducing devices, such as neutral density (ND) filters, configured to electrically control the light transmittance thereof to reduce the amount of light incident on photodetectors in image pickup apparatuses, increase the degree of flexibility in exposure control and enable image expressions that have not been possible with devices each having a fixed transmittance. There are several types of devices used as variable-light-transmittance devices. Among them, low-molecular-weight organic electrochromic devices (hereinafter, "electrochromic" is sometimes abbreviated as "EC") are characterized by achieving both high contrast between colored and decolored states and high maximum transmittance. Low-molecular-weight organic EC devices contain low-molecular-weight organic EC compounds in which the optical characteristics (absorption wavelength and absorbance) of their materials change through electrochemical redox reactions. When such a low-molecular-weight organic EC compound is used for an optical apparatus, suppressing the influence of a change in optical characteristics with time is an issue. Specifically, the issue is to suppress the influence of incomplete decoloring (residual coloring) in which some molecules of the low-molecular-weight organic EC compound remain in a colored state even under voltage conditions that bring the EC device into a decolored state and the color of the EC device changes under decoloring conditions. An example of the cause of this residual coloring is a charge imbalance, in which a charge balance is disturbed by the reduction of oxygen that has entered the EC device over time. The residual coloring due to the charge imbalance over time, typified by the reduction of entry oxygen, is mostly an anodic charge imbalance-induced residual coloring in which the colored form of the anodic EC compound is left. For this reason, there is a need to suppress this anodic charge imbalance-induced residual coloring.

Japanese Patent No. 3798980 discloses the use of non-EC materials that are more easily oxidized than anodic EC compounds in EC devices. Hereinafter, these materials are referred to as "redox buffers". In such an EC device, the oxidized form of the redox buffer is more stable than the oxidized form of the anodic EC compound that is in the colored form. Thus, even when an anodic charge imbalance occurs during the decoloring operation, in the range that can be covered by the amount of charge of the redox buffer, the oxidized form of the corresponding redox buffer is produced rather than leaving the colored form of the anodic EC compound. Since the redox buffer is non-EC, even when the oxidized or reduced form thereof is produced, the effect on transmittance is small. As a result, even if a charge imbalance occurs in the EC device, it does not directly lead to the residual coloring.

However, in the EC device disclosed in Japanese Patent No. 3798980, the redox buffer is more easily oxidized than the anodic EC compound, and thus more easily reactive potentially than the EC compound. Thus, the redox buffer reacts before the EC compound in the normal coloring operation of the EC device. As a result, unnecessary current that does not contribute to coloring flows, disadvantageously increasing the power consumption and deteriorating the response time, compared with the case where no redox buffer is used.

SUMMARY OF THE INVENTION

The present disclosure provides an EC device containing multiple types of anodic EC compounds of low-molecular-weight organic compounds, to suppress anodic charge imbalance-induced residual coloring without increasing power consumption or deteriorating response time.

According to a first aspect of the present disclosure, an electrochromic device includes a first electrode, a second electrode, an electrochromic layer disposed between the first electrode and the second electrode, the electrochromic layer containing multiple anodic electrochromic compounds of low-molecular-weight organic compounds and a cathodic redox substance, in which the electrochromic device is intended for a photodetector having multiple detection light wavelength regions, and $RG_{max}$ is 1.37 or less, in which $RG_{max}$ is a maximum value among ratios between RGB signal ratios in the transmission state of the electrochromic device and in colored states of the anodic electrochromic compounds, the RGB signal ratios are obtained from $T_A(\lambda)$ and the sensitivity of a photodetector, and $T_A(\lambda)$ is a normalized variable transmittance obtained by a combination of absorptions of the anodic electrochromic compounds.

According to a second aspect of the present disclosure, an electrochromic device includes a first electrode, a second electrode, an electrochromic layer disposed between the first electrode and the second electrode, the electrochromic layer containing multiple anodic electrochromic compounds of low-molecular-weight organic compounds and a cathodic redox substance, in which when the variable optical density of the anodic electrochromic compounds is defined as $\Delta OD_A(\lambda)$, the maximum value of the ratio between $\Delta OD_A(460\ nm)$ and $\Delta OD_A(550\ nm)$ is 1.90 or less, and the maximum value of the ratio between $\Delta OD_A(605\ nm)$ and $\Delta OD_A(510\ nm)$ is 1.72 or less.

According to a third aspect of the present disclosure, an optical filter includes the electrochromic device according to the first aspect and an active element coupled to the electrochromic device.

According to a fourth aspect of the present disclosure, an optical filter includes the electrochromic device according to the first aspect and a drive unit configured to drive the electrochromic device.

According to a fifth aspect of the present disclosure, a lens unit includes the optical filter according to the third aspect and an image pickup optical system including multiple lenses.

According to a sixth aspect of the present disclosure, an image pickup apparatus includes the optical filter according to the third aspect and a light-receiving device configured to receive light passed through the optical filter.

According to a seventh aspect of the present disclosure, a window member includes the electrochromic device according to the first aspect and an active element coupled to the electrochromic device.

According to an eighth aspect of the present disclosure, an electrochromic mirror includes the electrochromic device according to the first aspect and a reflective member disposed inside or outside the electrochromic device.

According to a ninth aspect of the present disclosure, an electrochromic device includes a first electrode, a second electrode, an electrochromic layer disposed between the first electrode and the second electrode, the electrochromic layer containing multiple anodic electrochromic compounds of low-molecular-weight organic compounds and a cathodic redox substance, in which when a variable optical density of the anodic electrochromic compounds is defined as $\Delta OD_A(\lambda)$, the maximum value of the ratio between the average of $\Delta OD_A$(445 nm to 475 nm) and the average of $\Delta OD_A$(535 nm to 565 nm) is 1.90 or less, and the maximum value of the ratio between the average of $\Delta OD_A$(590 nm to 620 nm) and the average of $\Delta OD_A$(495 nm to 525 nm) is 1.65 or less.

Further features of the present disclosure will become apparent from the following description of exemplary embodiments with reference to the attached drawings.

DESCRIPTION OF THE EMBODIMENTS

An electrochromic device according to an embodiment of the present disclosure contains multiple anodic electrochromic compounds. A first aspect of the present disclosure is characterized in that residual coloring is reduced by specifying $RG_{max}$, which is obtained on the basis of the variable transmittances of the anodic electrochromic compounds and the sensitivity of a target photodetector, as an index of the possibility of occurrence of residual coloring. A second aspect of the present disclosure is characterized in that residual coloring is reduced by specifying the ratios between variable transmittances of anodic electrochromic compounds at specific wavelengths as indices of the possibility of occurrence of the residual coloring.

An electrochromic device and an optical apparatus including the electrochromic device will be described in detail by way of embodiments with reference to the accompanying drawings. The present disclosure is not limited to the following embodiments. Various modifications and improvements of the following embodiments are also included in the scope of the present disclosure without departing from the spirit thereof on the basis of the usual knowledge of those skilled in the art.

Figure 1:
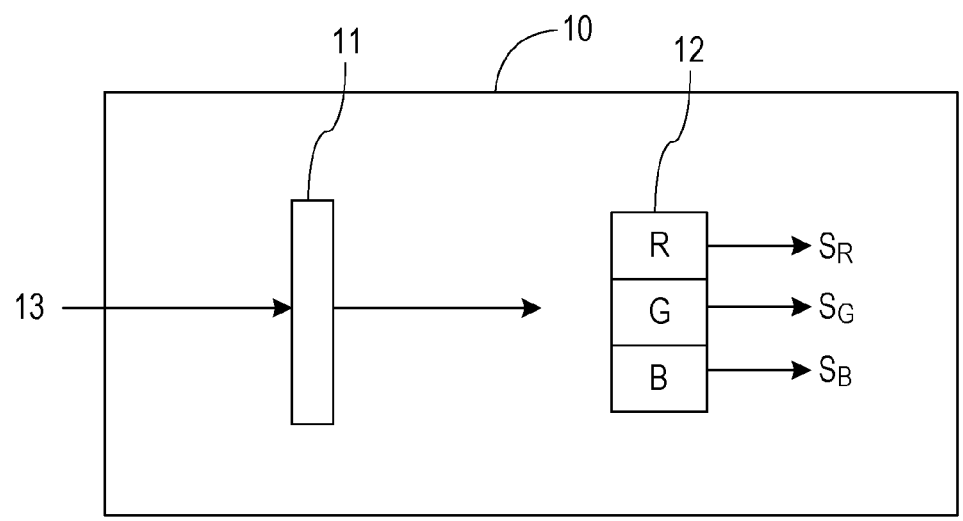
FIG. 1 illustrates a schematic configuration of an example of an optical apparatus including an EC device according to an embodiment of the present disclosure.

FIG. 1 illustrates a schematic configuration of an example of an optical apparatus including an electrochromic device (EC device) according to an embodiment of the present disclosure. In FIG. 1, an optical apparatus 10 includes an EC device 11 and a photodetector 12. The EC device 11 with a controlled transmittance transmits incident light 13 to adjust the amount of light incident on the photodetector 12. The incident light transmitted through the EC device 11 is incident on the photodetector 12 and converted into electrical signals and then into information sets, such as color and light intensity. The optical apparatus 10 may include a photographic optical system including multiple lenses and a diaphragm, and an infrared (IR) filter. In this case, the incident light incident on the optical apparatus 10 passes through the photographic optical system (not illustrated) including the multiple lenses and the diaphragm, passes through the EC device 11 and the IR filter (not illustrated), and is then incident on the photodetector 12. The EC device 11 may include a controller configured to control the transmittance thereof. In this case, the controller may be linked or integrated with a controller (not illustrated) of the optical apparatus 10 and may perform its function. The optical apparatus 10 may include, for example, a temperature sensor configured to acquire the temperature information of the EC device and a recording device, as needed. Each of the components illustrated in FIG. 1 will be specifically described below.

EC Device

The EC device 11 is a device configured to allow light to be introduced thereinto from the outside and allow the incident light to pass through at least a portion of an EC layer to change the characteristics of the outgoing light, typically the intensity of the light, with respect to the incident light in a given wavelength region.

Figure 2:
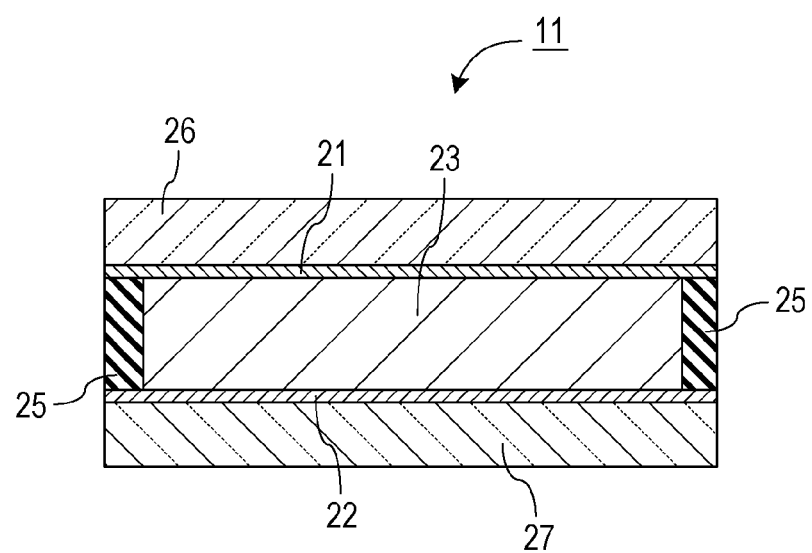
FIG. 2 is a schematic cross-sectional view illustrating the structure of an EC device according to an embodiment of the present disclosure.

FIG. 2 is a schematic cross-sectional view illustrating the structure of an EC device in the thickness direction according to an embodiment of the present disclosure. The EC device 11 according to this embodiment includes a first electrode 21, a second electrode 22, and an electrochromic layer (EC layer) 23 disposed between the first electrode 21 and the second electrode 22. The EC device 11 may include substrates (first substrate 26 and second substrate 27) and a sealant 25.

The EC device 11 in FIG. 2 is an example of the structure of the EC device according to an embodiment of the present disclosure, and the present disclosure is not limited to the structure illustrated in FIG. 2. For example, a layer of an antireflective film may be disposed between a corresponding one of the substrates and a corresponding one of the electrodes, or between the EC layer and one of the electrodes.

The maximum light reduction ratio of the transmission state to the light reduction state (the ratio of a certain amount of incident light to the amount of outgoing light (transmission state/light reduction state)) during normal use of the EC device according to an embodiment of the present disclosure is preferably 8 (ND 8) or more, more preferably 32 (ND 32) or more. There are two reasons for this as described below.

(a) Usefulness as EC Device: When the light reduction ratio is less than 8, the adjustable range of the EC device is limited, and the applicability as an EC device is strongly limited. When the light reduction ratio is 32 or more, the applicability as an EC device expands greatly.

(b) A larger light reduction ratio results in a larger maximum value of the degree of charge imbalance-induced residual coloring: When the light reduction ratio is as small as, for example, less than 8, the influence of residual coloring is relatively small, whereas when the light reduction ratio is 8 or more, the effect of residual coloring is large. When the light reduction ratio is 32 or more, the influence is very large. According to an embodiment of the present disclosure, the EC device in which anodic charge imbalance-induced residual coloring is suppressed is provided. To achieve this effect, the light reduction ratio is preferably 8 or more, more preferably 32 or more. The normal use refers to the conditions under which the EC device is normally used without disadvantages, e.g., not the conditions under which the characteristics of the EC device are rapidly deteriorated, but the values listed in the specification table.

Each constitutional element of the EC device will be described below.

Substrate

For the EC device 11 including the substrates 26 and 27 as illustrated in FIG. 2, when the EC device 11 is a transmissive type, both substrates needs to be transparent substrates. When the EC device 11 is a reflective type, at least the substrate on the side where light is incident and emitted needs to be a transparent substrate. The term "transparent" used herein indicates that the light transmittance is 50% or more and 100% or less, preferably 70% or more and 100% or less. The term "light" used in this specification refers to light in a target wavelength region for the use of the EC device. For example, when the EC device is used as an optical filter in the visible light region, the light refers to light in the visible light region. When the EC device is used as an optical filter in the infrared region, the light refers to light in the infrared region.

Specifically, substrates each composed of colorless or colored glass or a transparent resin can be used for the substrates. Examples of the glass include optical glass, quartz glass, white glass, soda-lime glass, borosilicate glass, alkali-free glass, and chemically strengthened glass. Examples of the transparent resin include poly(ethylene terephthalate), poly(ethylene naphthalate), polynorbornene, polyamide, polysulfone, poly(ether sulfone), poly(ether ketone), poly(phenylene sulfide), polycarbonate, polyimide, and poly(methyl methacrylate). When non-transparent substrate is used, a freely-selected substrate may be used without limitation.

Electrode

As a material for the first and second electrodes, a material that is stable in the operating environment of the EC device and that can allow a redox reaction to proceed rapidly in response to the application of an external voltage can be used. Examples of a material that can be used for the electrodes include transparent conductive materials and metals as described below.

At least one of the first and second electrodes can be a transparent electrode. The term "transparent" used herein indicates that the light transmittance is 50% or more and 100% or less. When at least one of the first and second electrodes is a transparent electrode, light can be efficiently introduced from outside the EC device and interact with the EC compound in the EC layer to reflect the optical characteristics of the EC compound in the outgoing light.

Examples of the transparent electrode that can be used include a film composed of a transparent conductive material on a substrate and a transparent electrode including a metal wire partially arranged on a transparent substrate. Here, although the metal wire itself is not transparent, an electrode including a metal wire partially disposed and having a light transmittance within the above range is referred to as a transparent electrode, in an embodiment of the present disclosure.

Examples of the transparent conductive material include transparent conductive oxides and carbon materials, such as carbon nanotubes. Examples of transparent conductive oxides include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Among these, ITO or FTO can be used.

When the electrode is composed of a transparent conductive oxide, the electrode can have a thickness of 10 nm or more and 10 μm or less. In particular, the use of electrodes being composed of ITO or FTO and having a thickness of 10 nm or more and 10 μm or less can provide both high optical transparency and chemical stability.

When the electrode is composed of a transparent conductive oxide, the electrode may have a structure in which sublayers of the transparent conductive oxide are stacked. This facilitates the achievement of high conductivity and high transparency. A porous electrode can also be used to increase the electrode area per projected area, thereby increasing the amounts of redox substance and EC compound immobilized on the electrode and increasing an electrode reaction.

Non-limiting examples of a metal that can be used as a material for the electrodes include electrochemically stable metals, such as silver (Ag), gold (Au), platinum (Pt), and titanium (Ti). As the pattern of the metal wire arranged, a grid-like pattern can be used. The electrode including the metal wire is typically a planar electrode. However, a curved electrode can also be used as needed.

As described above, at least one of the first and second electrodes can be a transparent electrode. When one of the electrodes is a transparent electrode, the other electrode can be selected in accordance with the application of the EC device. For example, when the EC device is a transmissive EC device, both the first and second electrodes can be transparent electrodes. When the EC device is a reflective EC device, one of the first and second electrodes can be a transparent electrode, and the other can be an electrode that reflects light to be introduced into the EC device.

The placement of a reflective layer or scattering layer between the first and second electrodes can improve the degree of flexibility of the optical characteristics of the other electrode described above. For example, when a reflective layer or scattering layer is disposed between the first and second electrodes, an opaque electrode or an electrode that absorbs target light can be used as the other electrode described above.

Regarding the arrangement of the first and second electrodes, a commonly known arrangement mode of the electrode arrangement of EC devices can be used. As a typical example, FIG. 2 illustrates a mode of arranging the first electrode 21 on the first substrate 26 and the second electrode 22 on the second substrate 27 in such a manner that the first electrode 21 and the second electrode 22 face each other with the EC layer 23 provided therebetween. The distance between the first electrode 21 and the second electrode 22 (interelectrode distance) can be 1 µm or more and 500 µm or less. When the interelectrode distance is increased, the thickness of the EC layer 23 can be increased, and the amount of the EC compound sufficient to function effectively as the EC device 11 can be placed in the EC layer 23. This is advantageous in that the transmittance in the colored state is easily reduced. A smaller interelectrode distance is advantageous in that the response time of the EC device 11 is easily reduced. The interelectrode distance of 1 µm or more and 500 µm or less, as described above, facilitates the achievement of low transmittance in the colored state and fast responsiveness.

Sealant

The sealant 25 is disposed between the first electrode 21 and the second electrode 22 as illustrated in FIG. 2 and connects the first electrode 21 to the second electrode 22.

The sealant can be composed of a material that is chemically stable, does not easily transmit gases and liquids, and does not interfere with the redox reaction of the EC compound. Examples of the material that can be used include inorganic materials, such as glass frit, organic materials, such as epoxy resins and acrylic resins, and metals.

The sealant may have the function of maintaining the distance between the first electrode 21 and the second electrode 22 by containing, for example, a spacer material. In this case, the first electrode 21, the second electrode 22, and the sealant 25 can form a space for placing the EC layer 23 between the electrodes.

When the sealant 25 does not have the function of defining the distance between the first electrode 21 and the second electrode 22, a spacer having the function of defining and holding the distance between the two electrodes may be separately arranged to maintain the distance between the two electrodes. Examples of a material that can be used for the spacer include inorganic materials, such as silica beads and glass fibers, and organic materials, such as polyimide, polytetrafluoroethylene, polydivinylbenzene, fluorocarbon rubber, and epoxy resin.

Electrochromic Layer

In the EC device according to an embodiment of the present disclosure, the EC layer contains multiple anodic EC compounds and a cathodic redox substance. As the cathodic redox substance, an EC compound serving as the cathodic redox substance can be used. Each of the anodic EC compound and the cathodic redox substance in the EC layer may be dissolved in a solvent or immobilized on the electrode. When they are dissolved in the solvent, the contrast between colored and decolored states can be increased by increasing the amounts of EC compounds and redox substance contained in the EC layer. When they are immobilized, the memory effect can be provided. A configuration may be used in which the first and second electrodes are porous electrodes and are united with the electrochromic layer.

Solvent

The solvent can be selected in accordance with the application in view of, for example, the solubility of the solute, such as the anodic EC compound and the cathodic redox substance used, the vapor pressure, the viscosity, and the potential window.

As the solvent, a solvent capable of dissolving the anodic EC compounds and the cathodic redox substance used can be used. A polar solvent can be used as the solvent. Specific examples thereof include organic polar solvents, such as ether compounds, nitrile compounds, alcohol compounds, dimethyl sulfoxide, dimethoxyethane, sulfolane, dimethylformamide, dimethylacetamide, and methylpyrrolidinone, and water. Among these, solvents containing cyclic ethers, such as propylene carbonate, ethylene carbonate, γ-butyrolactone, valerolactone, and dioxolane, can be used. These solvents containing cyclic ethers can be used in terms of the solubility of EC compounds, the boiling point, the vapor pressure, the viscosity, and the potential window. Among these cyclic ethers, solvents containing propylene carbonate and γ-butyrolactone can be particularly used. An ionic liquid can also be used as the solvent.

The above solvents may further contain additional polymers, gelling agents, or thickeners to increase the viscosity of the EC layer or allow the EC layer to gel. Polymer electrolytes and gel electrolytes may be used as solvents or electrolytes. Non-limiting examples of polymers include polyacrylonitrile, carboxymethylcellulose, poly(vinyl chloride), poly(ethylene oxide), poly(propylene oxide), polyurethane, polyacrylate, polymethacrylate, polyamide, polyacrylamide, polyester, Nafion (registered trademark), and derivatives thereof. When the viscosity of the EC layer is increased or the EC layer is gelled, the movement of the EC compounds in the EC layer is inhibited. This can further suppress the occurrence of vertical color separation.

The EC layer may also include a supporting electrolyte. The supporting electrolyte is not limited any particular supporting electrolyte as long as it is an ionically dissociative salt and exhibits good solubility in a solvent. The supporting electrolyte can be a substance stable at the operating potential of the EC device. For the supporting electrolyte, an electrolyte obtained by appropriately selecting a cation and an anion from various cations and anions and combining them together can be used. Examples of the cation include metal ions, such as alkali metal ions and alkaline-earth metal ions, and organic ions, such as quaternary ammonium ions. Specific examples thereof include $Li^+$, $Na^+$, $K^+$ $Ca^{2+}$, $Ba^{2+}$, a tetramethylammonium ion, a tetraethylammonium ion, and a tetrabutylammonium. Examples of the anion include anions of various fluorine compounds and halide ions. Specific examples thereof include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$. When a salt compound is used as the EC compound, the EC compound may also function as the supporting electrolyte. Examples of the EC compound that is also a salt compound include viologen derivatives.

A method for forming the EC device is not limited to any particular method. An example thereof is a method in which a liquid containing the solvent and the EC compounds is injected into the gap between the first and second electrodes by, for example, a vacuum injection method, an atmospheric injection method, or a meniscus method. Specifically, for example, the liquid containing the solvent and the EC compounds is injected into a cell defined by a pair of electrodes and a sealant through an opening portion (not illustrated) formed in a portion of the electrode or the sealant, and the opening portion is sealed with a sealing member.

Redox Substance and EC Compound

In an embodiment of the present disclosure, the EC layer disposed between the first electrode and the second electrode contains the multiple anodic EC compounds and the cathodic redox substance. As the cathodic redox substance, an EC compound serving as the cathodic redox substance can be used. A configuration may be used in which the first and second electrodes are porous electrodes and are united with the electrochromic layer.

In an embodiment of the present disclosure, at least two types of redox substances (including a low-molecular-weight organic EC compound) are contained between the first electrode and the second electrode. Specifically, the two redox substances contained between the first electrode and the second electrode are any of combinations described in (i) and (ii) below. A configuration described in (ii), which can increase the contrast between colored and decolored states, can be used. In each case, the anodic EC compound is a low-molecular-weight organic compound.

(i) Anodic EC compound and cathodic redox substance
(ii) Anodic EC compound and cathodic EC compound In an embodiment of the present disclosure, charge imbalance-induced residual coloring is suppressed in the EC device containing an anodic EC compound and a cathodic redox substance, which is called a complementary EC device. The concept of charge balance/imbalance will be described below.

The redox substance used in this specification refers to a compound that can be repeatedly oxidized and reduced within a predetermined potential range. Inorganic and organic redox substances can be used without any particular restrictions. Among these, a low-molecular-weight organic compound can be used because of its compatibility with the environment in which the low-molecular-weight organic EC compound is used. In this specification, the redox substance may be referred to as an anodic or cathodic redox substance. Usually, the anodic redox substance refers to a substance that is in a reduced state when no driving voltage is applied to the device, and that is in an oxidized state when the driving voltage is applied to the device. Usually, the cathodic redox substance refers to a substance that is in an oxidized state when no driving voltage is applied to the device, and that is in a reduced state when the driving voltage is applied to the device.

In this specification, the term "EC compound" refers to a type of redox substance and a compound whose optical characteristics change in a target light wavelength region for the EC device through redox reactions. Examples of the optical characteristics include light absorption characteristics and light reflection characteristics, and the optical characteristics are typically light absorption characteristics. The EC compound can also be said to be a compound whose light transmittance changes in the target light wavelength region for the EC device through the redox reactions. The term "change in optical characteristics" used here typically refers to the switching between a light-absorbing state and a light-transmitting state. In this case, the EC compound can be said to be a compound that switches between a light-absorbing state and a light-transmitting state through the redox reactions.

In this specification, the term "anodic EC compound" refers to an EC compound whose optical characteristics change in a target light wavelength region for the EC device through an oxidation reaction when the EC device is driven. The oxidation reaction is usually a reaction in which electrons are removed from the EC compound. In this specification, the term "cathodic EC compound" refers to an EC compound whose optical characteristics change in a target light wavelength region for the EC device through a reduction reaction when the EC device is driven. The reduction reaction is usually a reaction in which electrons are donated to the EC compound. A typical example of the anodic EC compound is a compound that changes from a light-transmitting state to a light-absorbing state through an oxidation reaction when the EC device is driven. A typical example of a cathodic EC compound is a compound that changes from a light-transmitting state to a light-absorbing state through a reduction reaction when the EC device is driven. An embodiment of the present disclosure is not limited to this, and a compound that changes from a light-absorbing state to a light-transmitting state through an oxidation reaction or a reduction reaction when the EC device is driven may be used. In the following description, in order to easily understand a change in the light absorption characteristics of an EC compound, a typical example in which an EC device changes from a light-transmitting state (decolored state) to a light-absorbing state (colored state) when the EC device is driven will be described.

Both the anodic and cathodic EC compounds can be in at least two different states from each other through oxidation reaction or reduction reaction caused by controlling a voltage applied across the first and second electrodes or by turning the EC device on and off. In this specification, a state in which an EC compound is oxidized through an oxidation reaction involving one or more electrons is referred to as an "oxidized form" of the EC compound. A state in which an EC compound is reduced through a reduction reaction involving one or more electrons is referred to as a "reduced form" of the EC compound. When the EC device is not driven, the anodic EC compound is in the reduced form. When the EC device is driven, the anodic EC compound is partially in the oxidized form. When the EC device is not driven, the cathodic EC compound is in the oxidized form. When the EC device is driven, the cathodic EC compound is partially in the reduced form.

In some literature, the state of an EC compound is expressed as changing from an oxidized form to a reduced form (and vice versa) via a neutral form. In the following description, however, oxidized forms and reduced forms are basically described on the basis of the knowledge that a reduced form is formed when an oxidized form is reduced and an oxidized form is formed when a reduced form is oxidized. For example, ferrocene containing divalent iron (neutral as the whole molecule) is a reduced form of ferrocene (an anodic redox substance) when the ferrocene functions as an anodic redox substance. A substance (ferrocenium ion) containing trivalent iron formed as a result of oxidation of the reduced form is an oxidized form of ferrocene (an anodic redox substance), particularly, a first oxidized form. When a dication salt of viologen functions as a cathodic EC compound, the dication salt is an oxidized form of the cathodic EC compound. A monocation salt formed by one-electron reduction of the dication salt is a reduced form of the cathodic EC compound, particularly, a first reduced form.

EC compounds according to this embodiment are each a low-molecular-weight organic compound having a molecular weight of 2,000 or less.

Here, "a molecular weight of 2,000 or less" indicates that the molecular weight of the molecule excluding counter ions is 2,000 or less. An anodic EC compound and a cathodic EC compound can each be a compound that is changed from a decolored form to a colored form by driving the EC device. As the EC compounds, multiple types of anodic EC compounds are contained, and multiple types of cathodic EC compounds may be contained.

Examples of the anodic EC compounds include aromatic amine compounds. Among these, dihydrophenazine derivatives can be used. This is because dihydrophenazine derivatives exhibit high durability in an accelerated drive test. This compound has an absorption peak in the ultraviolet region in the neutral state (reduced form), has no absorption in the visible light region, and is in a decolored state with high transmittance in the visible light region. When this molecule is converted into a radical cation (oxidized form) through an oxidation reaction, the absorption peak shifts to the visible light region, resulting in a colored state. The absorption wavelength of this molecule can be changed to some extent by increasing or decreasing its π-conjugation length and by changing the substituent to modify the π-conjugation system. Phenazine derivatives typically have an absorption peak at about 500 nm in the colored state and exhibit a yellow to red color in the colored state. In the anodic charge imbalance state over time, the color of the colored state of this anodic EC compound, that is, the yellow to red color of the dihydrophenazine derivative, remains in the decolored state. The absorption wavelength region of the colored form of a single type of dihydrophenazine derivative is not wide. For this reason, multiple types of compounds can be used for applications that require absorption over a wide wavelength range, such as ND filters. This can improve the color reproducibility when the compounds are used for an ND filter, for example.

Non-limiting examples of the cathodic EC compound include pyridine derivatives, such as viologen derivatives, and quinone compounds. Among these, pyridine derivatives, such as viologen derivatives, can be used.

The cathodic EC compound can be a compound containing a pyridine skeleton or quinone skeleton. The cathodic EC compound can be a compound represented by general formula (1) below.

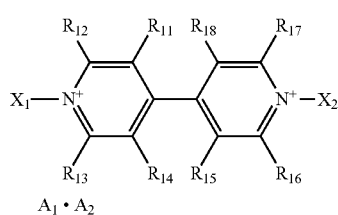

$A_1 \cdot A_2$ (1)

In general formula (1), $X_1$ and $X_2$ are each independently selected from alkyl groups, aralkyl groups, and aryl groups. The alkyl groups, the aralkyl groups, and the aryl groups may have substituents. $R_{11}$ to $R_{18}$ are each independently a hydrogen atom, an alkyl group, an aralkyl group, an alkoxy group, an aryl group, a heterocyclic group, a substituted amino group, a halogen atom, or an acyl group. Each of the alkyl group, the alkoxy group, the aralkyl group, the aryl group, and the heterocyclic group may have a substituent and may have a cyclic structure. $A_1^-$ and $A_2^-$ are each independently a monovalent anion.

Charge Balance/Imbalance

The concept of charge balance/imbalance will be described below with reference to the drawings.

Figure 3A:
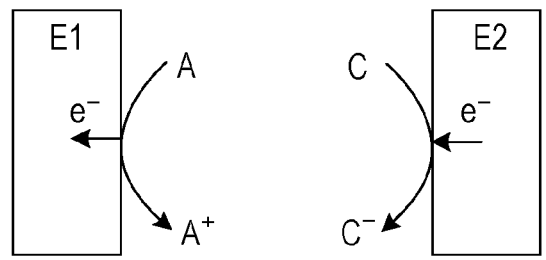
FIGS. 3A to 3C are explanatory views each illustrating the concept of a charge balance/imbalance in an EC device.
Figure 3B:
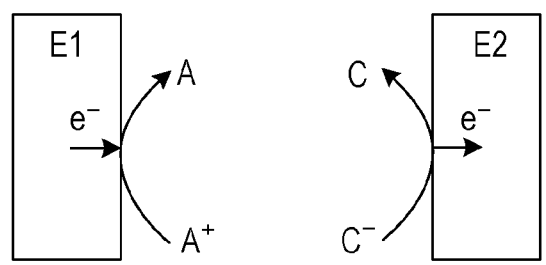
Figure 3C:
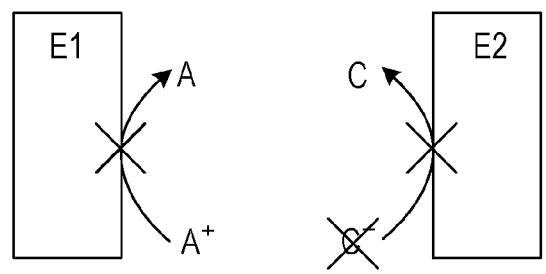

FIGS. 3A to 3C are explanatory views illustrating the concept of a charge balance/imbalance. FIGS. 3A to 3C illustrate a complementary EC device with a system containing an anodic EC compound and a cathodic EC compound. Each of FIGS. 3A to 3C illustrates a first electrode E1 as an anode and a second electrode E2 as a cathode. In each of FIGS. 3A to 3C, A is the reduced form of the anodic EC compound (decolored state), and $A^+$ is the oxidized form of the anodic EC compound (colored state). In each of FIGS. 3A to 3C, C is the oxidized form of the cathodic EC compound (decolored state), and $C^-$ is the reduced form of the cathodic EC compound (colored state).

FIG. 3A illustrates the coloring process of the EC device. When a coloring voltage is applied across the first electrode E1 and the second electrode E2, the oxidation reaction of the anodic EC compound as described in (α) below proceeds at the first electrode E1, and the reduction reaction of the cathodic EC compound as described in (β) below proceeds at the second electrode E2.

$$A \rightarrow A^+ + e^-$$ (α)

$$C + e^- \rightarrow C^-$$ (β)

As these reactions proceed, the EC layer is in a colored state.

FIG. 3B illustrates the decoloring process, which is the opposite process to the coloring process. When the EC layer is decolored, the application of a decoloring voltage (e.g., short circuit (0 V)) across the first electrode E1 and the second electrode E2 allows the reverse reactions of the reactions illustrated in FIG. 3A to proceed, as indicated by the arc-shaped arrows illustrated in FIG. 3B. In this way, the EC compound in the colored state can be returned to the decolored state.

When the reactions illustrated in FIGS. 3A and 3B are repeated, the charge balance of the EC device is normal, and the device repeats coloring and decoloring normally.

As the EC device is driven, a process other than the normal coloring/decoloring process may occur partially to cause the charge balance to be disturbed. There are several types of causes for this. Here, a cause for this will be described with reference to FIG. 3C by taking the deterioration of the reduced form of the cathodic EC compound as an example (the irreversible reduction reaction of oxygen that has entered the EC device is a similar process). When the reduced form $C^-$ of the cathodic EC compound, which has been colored through the normal coloring process, deteriorates and is no longer able to react at the second electrode E2, or when an irreversible reduction reaction of oxygen that has entered the EC device occurs, the oxidized form $A^+$ of the anodic EC compound loses the supply source of electrons at the first electrode E1 and is unable to react. In the following description, this phenomenon is referred to as the disturbance of the charge balance, or charge imbalance. As a result of the occurrence of the charge imbalance, the EC device exhibits incomplete decoloring, where the colored form of the anodic EC compound remains, even though the anodic EC compound is normal.

An example of the cause of the occurrence of the charge imbalance is the irreversible electron transfer reaction of substrates that undergoes the redox reaction (in particular, the electrode reaction). Specific examples thereof include chemical reactions of impurities (originating from the EC compounds, environmental impurities, such as oxygen and water, and originating from the sealant) and chemical reactions of radicals. A typical example among them is the irreversible reduction of oxygen that has entered the EC device. In this case, the colored form of the anodic EC compound remains, resulting in incomplete decoloring.

Photodetector

The EC device according to an embodiment of the present disclosure is intended for a specific photodetector. In other words, this EC device is designed to function in combination with the specific photodetector. Examples thereof include a combination of a camera system including a camera and an interchangeable lens and an image pickup device, such as a CMOS sensor; a combination of a variable transmittance window and the human eye; a combination of variable transmittance glasses and the human eye; and a combination of a variable reflectance mirror and the human eye. This photodetector is a photodetector having multiple detection light wavelength regions. For example, in the case of a CMOS sensor for imaging, it has multiple detection light wavelength regions of R, G, and B. In the case of the human eye, for example, it has multiple detection light wavelength regions of x-bar, y-bar, and z-bar of the CIE color matching functions.

The detection light wavelength region of a photodetector is the wavelength region for which the photodetector has significant spectral sensitivity. The spectral sensitivity of a photodetector is the spectral sensitivity when it is used in the normal configuration for that photodetector. Specifically, when a photodetector is used as a camera system, the spectral sensitivity refers to spectral sensitivity including other optical elements, such as UV and IR cut filters and low-pass filters, which are normally used in the camera system.

Figure 4A:
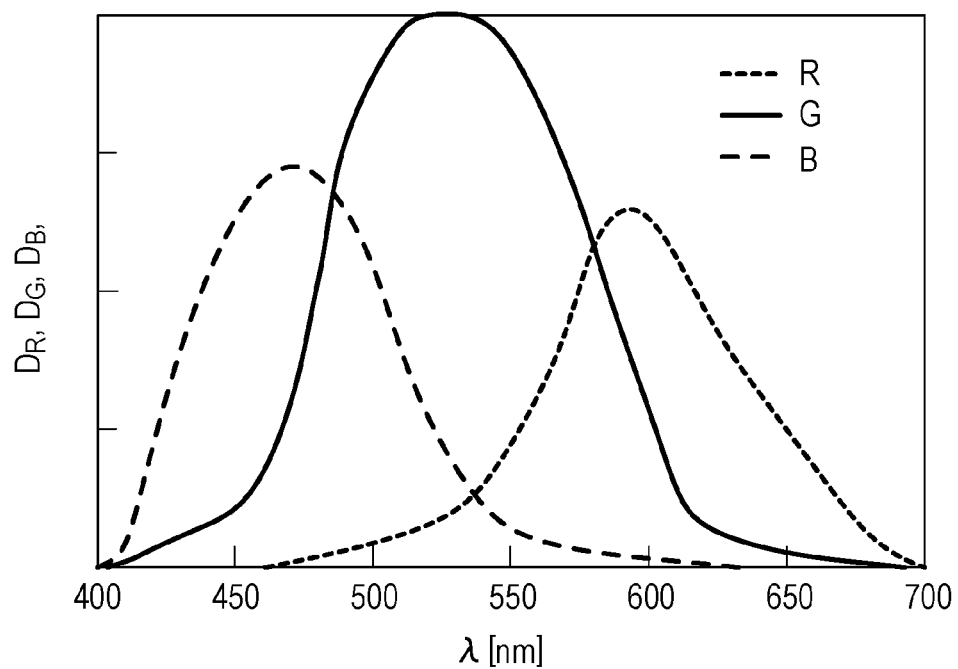
FIGS. 4A and 4B each illustrate an example of the spectral sensitivity of a target photodetector for an EC device.

FIG. 4A illustrates an example of the spectral sensitivity of an RGB image pickup device when the photodetector is used in a camera system, the spectral sensitivity being affected by the transmittance of UV and IR cut filters and low-pass filter. When the photodetector is the human eye, the CIE color matching functions correspond to the spectral sensitivity.

Figure 4B:
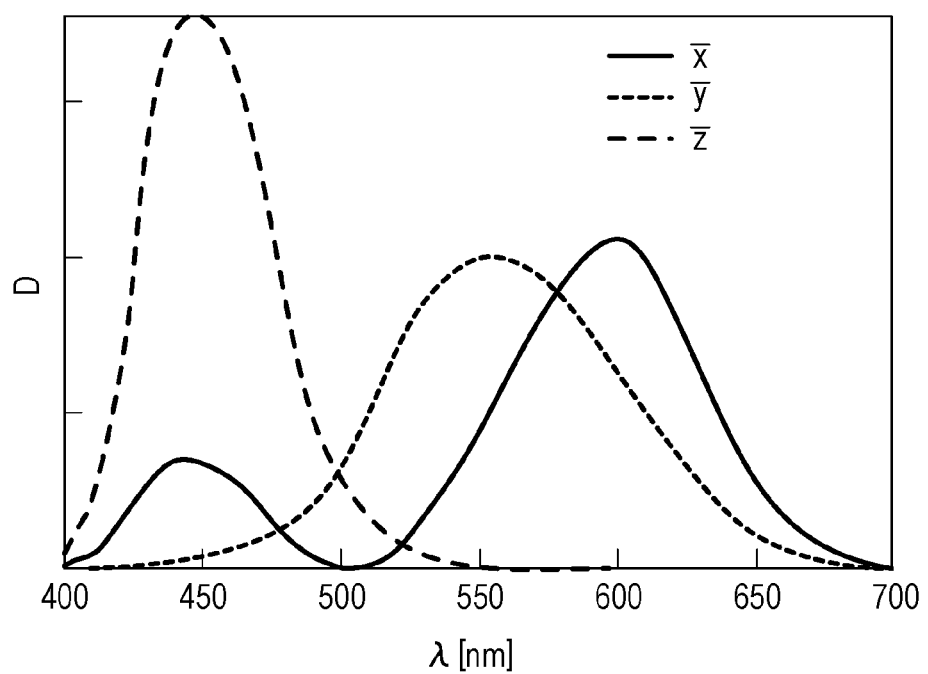

FIG. 4B illustrates the CIE color matching functions. A typical example of the detection light wavelength regions of these photodetectors is a region that is 425 nm or more and 680 nm or less. One further example is a wavelength region with a sensitivity of 10% or more of the maximum value of the spectral sensitivity of a photodetector.

Incident Light

Light incident on the EC device (light incident on the photodetector through the EC device) will be described.

Figure 5:
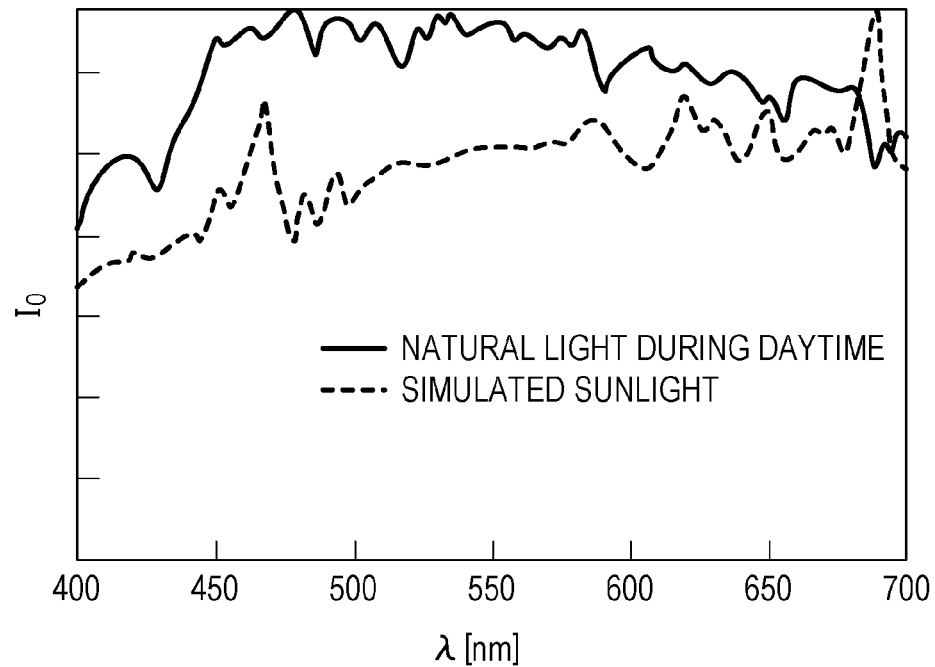
FIG. 5 illustrates examples of spectra of incident light sources.

The EC device according to an embodiment of the present disclosure is an EC device in which anodic charge imbalance-induced residual coloring is suppressed. As the light source of the reference incident light, natural light during the daytime, which is frequently used for EC devices, can be selected, and the corresponding light source can be selected. FIG. 5 illustrates examples of spectra of natural light during the daytime and simulated sunlight having a color temperature of about 5,000 K. Examples of defined light sources include CIE D65, D55, D50, B light source, and C light source.

Principle of Suppression of Anodic Charge Imbalance-Induced Residual Coloring

The spectrum of a complementary EC device is typically designed as described below.

The absorption spectrum of the colored form of the characteristic anodic EC compound is complementarily combined with the absorption spectrum of the colored form of the cathodic EC compound having absorption at a wavelength different from the colored form of the anodic EC compound. This allows the EC device as a whole to achieve an absorption spectrum having a low dependence on wavelength (high ND) in the colored state. The colored form of the anodic EC compound of a low-molecular-weight organic compound used in such an EC device often has a relatively sharp absorption spectrum. For example, a dihydrophenazine derivative, a typical anodic EC compound, has an absorption peak of about 500 nm in the colored state, and exhibits a yellow to red color in the colored state. In the anodic charge imbalance state of an EC device over time, the color of the colored state of the anodic EC compound remains in the decolored state.

To deal with this, the inventors have conceived the idea of suppressing residual coloring even when a charge imbalance occurs by bringing the absorption spectrum of the combined absorption spectrum of the individual colored forms of multiple anodic EC compounds (i.e., the absorption spectrum of the colored forms of the multiple anodic EC compounds) close to an achromatic color (regardless of the absorption spectrum of a cathodic EC compound). To achieve this, the inventors have developed $RG_{max}$, which is an index of the susceptibility to residual coloring when a charge imbalance occurs. An effective range for suppressing the anodic charge imbalance-induced residual coloring has been identified using $RG_{max}$. The spectral conditions of the colored states of the anodic EC compounds have been derived. The types and concentrations of the anodic EC compounds have been selected in accordance with the conditions. These have led to the completion of the disclosure. This index $RG_{max}$ and the conditions will be specifically described below.

$RG_{max}$

In the optical apparatus 10 illustrated in FIG. 1, the photodetector 12 is an RGB image pickup device having an effective wavelength region of $\lambda_0$ to $\lambda_1$ and spectral sensitivity of $D_R(\lambda)$, $D_G(\lambda)$, and $D_B(\lambda)$. The signal intensities output corresponding to the light incident on the image pickup device are defined as $S_R$, $S_G$, and $S_B$. R stands for red, G for green, and B for blue. The transmittance of the transmission state of the EC device is defined as $T_0(\lambda)$. The effective maximum variable optical density of the EC device (the maximum variable optical density during the normal operation of the EC device, absorption by the anodic EC compounds+the cathodic EC compound) is defined as $\Delta OD_{max}$. The average variable optical density in the effective wavelength region of the photodetector is defined as B. The normalized variable optical density (absorption by the anodic EC compounds and the cathodic EC compound, average optical density=1) obtained by normalizing $\Delta OD_{max}$ using the average variable optical density B is defined as $\Delta OD_{ave}$. The extent of contribution of the colored forms of the anodic EC compounds and the extent of contribution of the colored form of the cathodic EC compound in $\Delta OD_{ave}$ are defined as $\Delta OD_{Aave}$ and $\Delta OD_{Cave}$, respectively ($\Delta OD_{ave}=\Delta OD_{Aave}+\Delta OD_{Cave}$). The normalized variable transmittance $T_A(\lambda)$ of the anodic EC compounds and the normalized variable transmittance $T_C(\lambda)$ of the cathodic EC compound are given by equations below.

$$T_A(\lambda)=10^{-\Delta OD_{Aave}(\lambda)}$$

$$T_C(\lambda)=10^{-\Delta OD_{Cave}(\lambda)}$$

The RGB signal intensities of the image pickup device when the charge balance is normal are given by equations below using the spectrum $I_0(\lambda)$ of incident light.

$$S_{RT} = \int_{\lambda_0}^{\lambda_1} I_0(\lambda)T_0(\lambda)D_R(\lambda)d\lambda$$

$$S_{GT} = \int_{\lambda_0}^{\lambda_1} I_0(\lambda)T_0(\lambda)D_G(\lambda)d\lambda$$

$$S_{BT} = \int_{\lambda_0}^{\lambda_1} I_0(\lambda)T_0(\lambda)D_B(\lambda)d\lambda$$

$S_{RT}$, $S_{GT}$, and $S_{BT}$ are as described below.

$S_{RT}$: The detected signal intensity of light transmitted through the electrochromic device in the transmission state and detected by the photodetector in the red wavelength region.

$S_{GT}$: The detected signal intensity of light transmitted through the electrochromic device in the transmission state and detected by the photodetector in the green wavelength region.

$S_{BT}$: The detected signal intensity of light transmitted through the electrochromic device in the transmission state and detected by the photodetector in the blue wavelength region.

When a charge imbalance occurs to leave the colored forms of the anodic EC compounds corresponding to the normalized variable transmittance $T_A(\lambda)$ of the anodic EC compounds, the RGB signal intensities $S_{RI}$, $S_{GI}$, and $S_{BI}$ of the image pickup device are given by equations below.

$$S_{RI} = \int_{\lambda_0}^{\lambda_1} I_0(\lambda)T_0(\lambda)T_A(\lambda)D_R(\lambda)d\lambda$$

$$S_{GI} = \int_{\lambda_0}^{\lambda_1} I_0(\lambda)T_0(\lambda)T_A(\lambda)D_G(\lambda)d\lambda$$

$$S_{BI} = \int_{\lambda_0}^{\lambda_1} I_0(\lambda)T_0(\lambda)T_A(\lambda)D_B(\lambda)d\lambda$$

$S_{RI}$, $S_{GI}$, and $S_{BI}$ are as described below.

$S_{RI}$: The detected signal intensity of light transmitted through the anodic electrochromic compounds in the colored states and detected by the photodetector in the red wavelength region.

$S_{GI}$: The detected signal intensity of light transmitted through the anodic electrochromic compounds in the colored states and detected by the photodetector in the green wavelength region.

$S_{BI}$: The detected signal intensity of light transmitted through the anodic electrochromic compounds in the colored states and detected by the photodetector in the blue wavelength region.

Let us consider the correction ratios of the R and B signals for the respective detection light wavelength regions of the photodetector in the transmission state using G, as the reference, of RGB. The signal ratios $G_{RT}$ and $G_{BT}$ in the normal charge-balanced state and the signal ratios $G_{RI}$ and $G_{BI}$ in the charge-imbalanced state are expressed as gains (reciprocals) with respect to G, as described in equations below.

$G_{RT}=S_{GT}/S_{RT}$ $G_{BT}=S_{GT}/S_{BT}$ $G_{RI}=S_{GI}/S_{RI}$ $G_{BI}=S_{GI}/S_{BI}$ $RG_R$ and $RG_B$, which are used as the degree of change in these signal correction ratios, are given by the ratios of GR and GB in the normal charge-balanced states and the charge-imbalanced states, respectively, as described in the following equations.

$RG_R=G_R/G_{RT}$ $RG_B=G_B/G_{BT}$

The index $RG_{max}$, which indicates the possibility of the occurrence of residual coloring when a charge imbalance occurs, is defined as the maximum value among the above four values of $RG_R$, $RG_B$, and their reciprocals ($1/RG_R$ and $1/RG_B$), i.e., $G_{RI}/G_{RT}$, $G_{RT}/G_{RI}$, $G_{BI}/G_{BT}$, and $G_{BT}/G_{BI}$.

That is, $RG_{max}$ is the maximum value among ratios between $RG_B$ signal ratios in the transmission state of the EC device and in the colored states of the anodic EC compounds, the $RG_B$ signal ratios being obtained from the normalized variable transmittance $T_A(\lambda)$ and the sensitivity of the photodetector.

The effect of $RG_{max}$ on the possibility of residual coloring when a charge imbalance occurs is evaluated using a white balance gain change ($\Delta$WBG). The $\Delta$WBG is expressed as the ratio between the white balance gain of the RGB signals acquired by the image pickup device in the charge-imbalanced state and the white balance gain in the normal charge-balanced state (whichever of normal balance/imbalance and imbalance/normal balance is greater).

Figure 6:
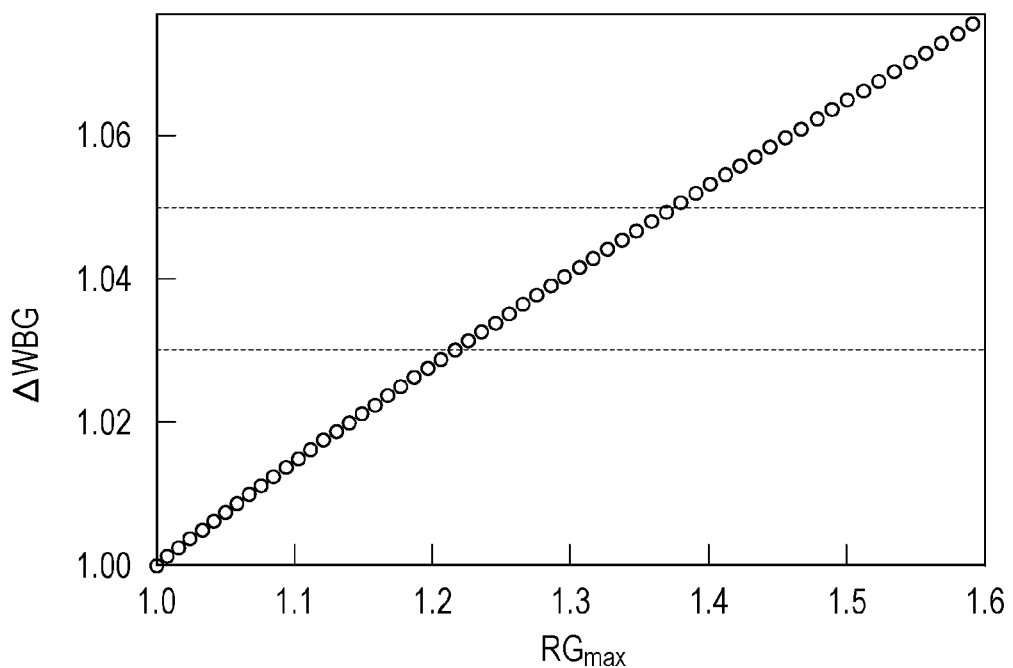
FIG. 6 illustrates the relationship between $RG_{max}$ and a change in white balance gain.

FIG. 6 is a graph illustrating the relationship between $\Delta$WBG and $RG_{max}$, where the vertical axis represents $\Delta$WBG, and the horizontal axis represents $RG_{max}$. Here, $\Delta$WBG and $RG_{max}$ were simulated using conditions below. As a normalized variable optical density spectrum, a spectrum consisting of the following two groups was freely combined in such a manner that the sum of the proportions of the components was equal to 1, and used.

(I) The normalized variable optical density ($\Delta OD_{Aave}$ or $\Delta OD_{Cave}$) spectrum of the following compound (2) that is a typical anodic EC compound of a low-molecular-weight organic compound or the following compound (3) that is a typical cathodic EC compound of a low-molecular-weight organic compound.

(II) A flat (wavelength-independent) variable optical density spectrum.

The average variable optical density B in the effective wavelength region of the photodetector was 0.5. Natural light during the daytime illustrated in FIG. 5 was used as a light source. The spectral sensitivity of the image pickup device illustrated in FIG. 4A was used as the spectral sensitivity of the photodetector.

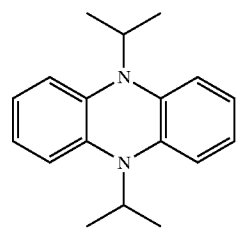

(2)

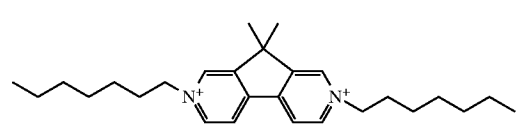

(3)

2 $(CF_3SO_2)_2N^-$

The results indicate that ΔWBG serving as an index of the charge imbalance-induced residual coloring increases with increasing $RG_{max}$ and thus $RG_{max}$ effectively functions as an index of the possibility of the occurrence of residual coloring when a charge imbalance occurs.

When the EC device according to an embodiment of the present disclosure is used as a unit (ND filter) configured to adjust the amount of light in the visible light region, the white balance gain change can be in the range of 5% or less. When the EC device according to an embodiment of the present disclosure is used as an advanced unit configured to adjust the amount of light, the white balance gain change can be in the range of 3% or less. These values are those evaluated by sensory evaluation to be at a level where the former range is unlikely to be perceived as a clear color change (residual coloring) of the device, and the latter range is unlikely to be perceived as a color change (residual coloring) of the device.

From FIG. 6, $RG_{max}$ is preferably in the range of 1.37 or less where the white balance gain change is in the range of 5% or less, and $RG_{max}$ is more preferably in the range of 1.21 or less where the white balance gain change is in the range of 3% or less. In an embodiment of the present disclosure, it is possible to provide the EC device in which the anodic charge imbalance-induced residual coloring is suppressed by selecting the types and concentrations of the anodic EC compounds so as to provide such an $RG_{max}$ value.

The reason why the multiple anodic EC compounds are used in the EC device according to an embodiment of the present disclosure is that the colored form of the anodic low-molecular-weight organic EC compound typically has a narrow absorption wavelength region. For applications, such as ND filters, it is possible to prevent a color (absorption wavelength) bias by using multiple types of EC compounds and overlapping their absorption wavelength regions. Three or more types of EC compounds can be combined. The reason for this will be described below.

(a) When a variable transmittance spectrum is formed by combining EC compounds having different variable absorption spectra, the use of a larger number of types of EC compounds can complement the absorption wavelengths more finely. This enables higher color reproducibility and suppression of residual coloring when a charge imbalance occurs. Specifically, this can be explained as follows. In terms of the concentration ratio, in the case of two types of EC compounds, when the concentration ratio of one EC compound is determined, there is no degree of flexibility in the concentration ratio of the other.

In the case of three or more EC compounds, even if the concentration ratio of one EC compound is determined, there is a degree of flexibility in the concentration ratio of the other two EC compounds, enabling a more detailed complement of absorption wavelengths.

(b) A target photodetector for an ND filter has three or more detection wavelength regions, as represented by the human eye and RGB sensors. In the case of three or more EC compounds, the degree of light absorption corresponding to each detection wavelength region can be adjusted with a relatively high degree of flexibility with respect to the other EC compounds. Thus, in an embodiment of the present disclosure, the effect of suppressing residual coloring when a charge imbalance occurs can be greatly improved.

In view of the above, at least one EC compound selected from the multiple anodic EC compounds can have a variable absorption spectrum peak in each one of the multiple detection light wavelength regions of the photodetector. Thus, the light absorption corresponding to each of the detection light wavelength regions of the photodetector can be adjusted with a higher degree of flexibility with respect to the other EC compounds. In this case, each one of the multiple detection light wavelength regions of the photodetector is the wavelength region of the maximum detection wavelength region in the normalized sensitivity spectrum of the photodetector.

As an example, in the detection light regions of the multiple detection light wavelength regions (x-bar, y-bar, and z-bar) illustrated in FIG. 4B, x-bar is in the range of 580 nm to 680 nm, y-bar is in the range of 500 nm to 580 nm, and z-bar is in the range of 425 nm to 500 nm. In each of these regions, at least one compound selected from the multiple anodic EC compounds can have a variable absorption spectrum peak.

For easier understanding and application of the present disclosure, in addition to $RG_{max}$, which is an index of the possibility of the occurrence of residual coloring when a charge imbalance occurs, the ratios between variable optical densities ($\Delta OD_A(\lambda)$) of the anodic EC compounds at specific wavelengths are presented as indices. To select effective wavelengths as the specific wavelengths, the dependence of the possibility of occurrence of the residual coloring on wavelength was examined.

Figure 7:
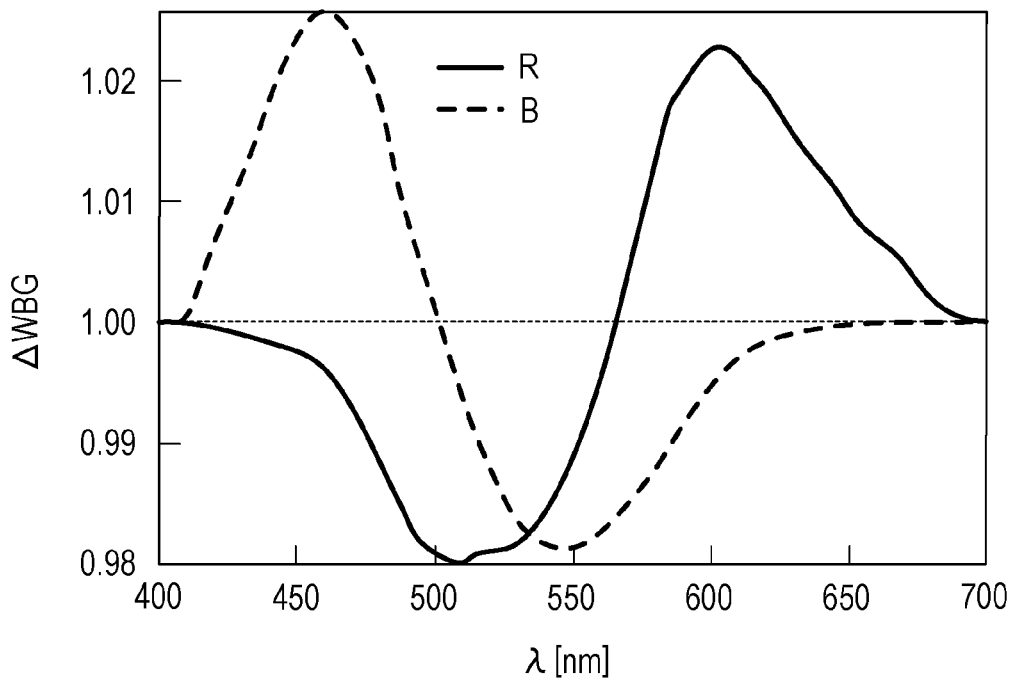
FIG. 7 illustrates the effect of the wavelength of incident light on a change in white balance gain.

FIG. 7 illustrates the effect of the wavelength of incident light (horizontal axis) on the white balance gain change (vertical axis). Specifically, the white balance gain change is simulated when the transmittance of the EC element at a certain wavelength is halved. The conditions used here were as follows: Natural light during the daytime illustrated in FIG. 5 was used as a light source. The spectral sensitivity of the image pickup device illustrated in FIG. 4A was used as the spectral sensitivity of the photodetector. As the spectra of the EC compounds, the same spectra as in FIG. 12A were used. It can be seen that the wavelengths of 510 nm and 605 nm have the greatest effect on the R gain change, and the wavelengths of 460 nm and 550 nm have the greatest effect on the B gain change. Thus, for each of the R gain and the B gain, the ratio between the variable optical densities ($R_{\Delta OD}$) at the wavelengths with the greatest effect was used as an index. The effect of $R_{\Delta OD}$ on the possibility of the occurrence of residual coloring when a charge imbalance occurs is evaluated using the white balance gain change (ΔWBG).

Figure 8:
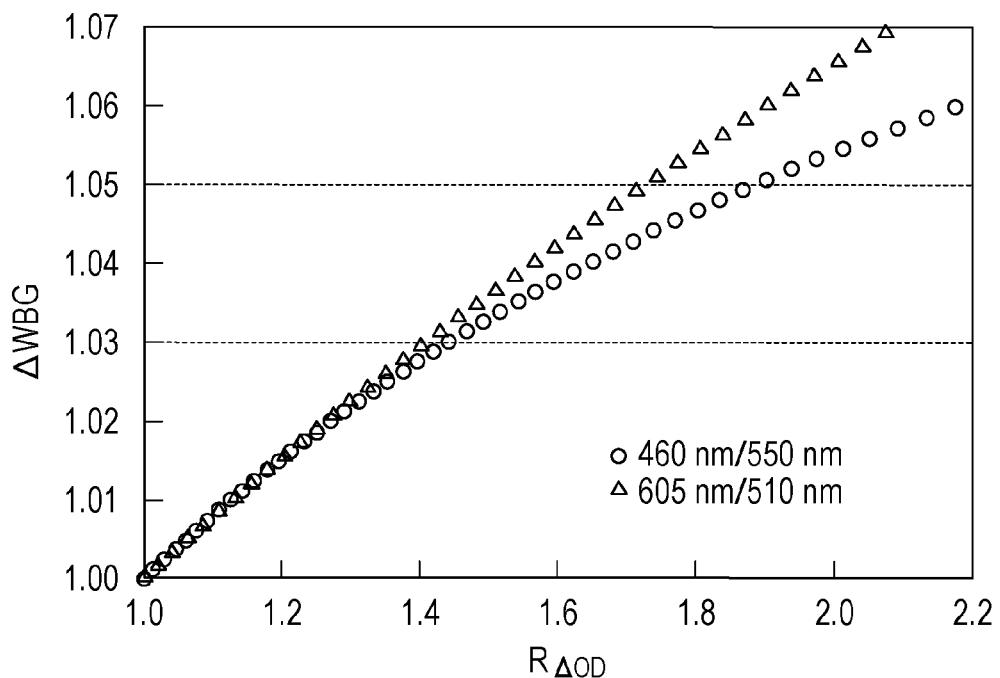
FIG. 8 illustrates the relationship between $R_{\Delta OD}$ and a change in white balance gain.

FIG. 8 is a graph illustrating the relationship between ΔWBG and $R_{\Delta OD}$, where the vertical axis represents ΔWBG, and the horizontal axis represents $R_{\Delta OD}$. Here, ΔWBG and $R_{\Delta OD}$ were simulated using the same conditions as for $RG_{max}$ described above. The results indicate that ΔWBG serving as an index of the charge imbalance-induced residual coloring increases with increasing $R_{\Delta OD}$ and thus $R_{\Delta OD}$ effectively functions as an index of the possibility of the occurrence of residual coloring when a charge imbalance occurs. In FIG. 8, "460 nm/550 nm" refers to the maximum value of the ratio between $\Delta OD_A(460\ nm)$ and $\Delta OD_A(550\ nm)$, and "605 nm/510 nm" refers to the maximum value of the ratio between $\Delta OD_A(605\ nm)$ and $\Delta OD_A(510\ nm)$.

When the EC device according to an embodiment of the present disclosure is used as a unit (ND filter) configured to adjust the amount of light in the visible light region, the white balance gain change can be in the range of 5% or less as described above.

When the EC device according to an embodiment of the present disclosure is used as an advanced unit configured to adjust the amount of light, the white balance gain change can be in the range of 3% or less.

From FIG. 8, preferably, $R_{\Delta OD}$ is in the range of 1.90 or less for the maximum value of the ratio between $\Delta OD_A(460$ nm) and $\Delta OD_A(550$ nm) and 1.72 or less for the maximum value of the ratio between $\Delta OD_A(605$ nm) and $\Delta OD_A(510$ nm), where the white balance gain change is in the range of 5% or less.

Figure 12A:
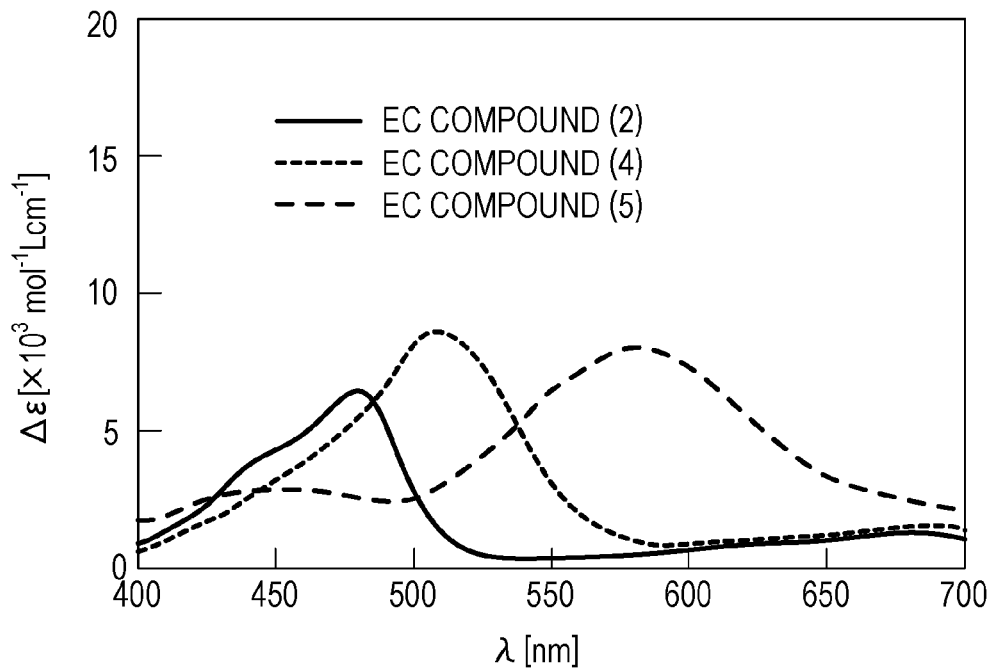
FIGS. 12A and 12B each illustrate modified molar absorption coefficient spectra of EC compounds used in Examples.

More preferably, $R_{\Delta OD}$ is in the range of 1.44 or less for the maximum value of the ratio between $\Delta OD_A(460$ nm) and $\Delta OD_A(550$ nm) and 1.41 or less for the maximum value of the ratio between $\Delta OD_A(605$ nm) and $\Delta OD_A(510$ nm), where the white balance gain change is in the range of 3% or less. Here, the maximum value of the ratio between $\Delta OD_A(\lambda_n)$ and $\Delta OD_A(\lambda_m)$ is defined as $\Delta OD_A(\lambda_n)/\Delta OD_A(\lambda_m)$ or $\Delta OD_A(\lambda_m)/\Delta OD_A(\lambda_n)$, whichever is greater. In an embodiment of the present disclosure, it is possible to provide the EC device in which the anodic charge imbalance-induced residual coloring is suppressed by selecting the types and concentration ratios of anodic EC compounds so as to provide such $R_{\Delta OD}$ values. Low-molecular-weight organic EC compounds that can be used in an embodiment of the present disclosure have absorption spectra as illustrated in FIG. 12A. The spectrum of each of the EC compounds exhibits an absorbance peak at a specific wavelength and has a width of absorbance in the wavelength direction centered on the peak. As illustrated in FIG. 4A, the spectral sensitivity of the target photodetector for the EC device according to an embodiment of the present disclosure also exhibits sensitivity peaks at specific wavelengths and has widths of sensitivity in the wavelength direction centered on the peaks. Thus, the wavelength-dependent profile of the white balance gain change also has a width in the wavelength direction. For this reason, we have considered evaluating the $\Delta OD_A$ ratio to suppress the white balance gain change by increasing the width of the wavelength range over which the ratio is calculated. When this width is small, the stability of the effect may be somewhat reduced for an EC compound having a sharp absorption spectrum with a narrow wavelength range. That is, the effect may be stronger or weaker, depending on whether it matches the selected wavelength. When this width is large, the effect on the white balance gain change decreases, and the effectiveness as an evaluation index tends to deteriorate. That is, the specificity for the RGB signals decreases. Accordingly, we have examined the appropriate value of the width of the wavelength range for calculating the $\Delta OD_A$ ratio to suppress the white balance gain change.

Figure 14:
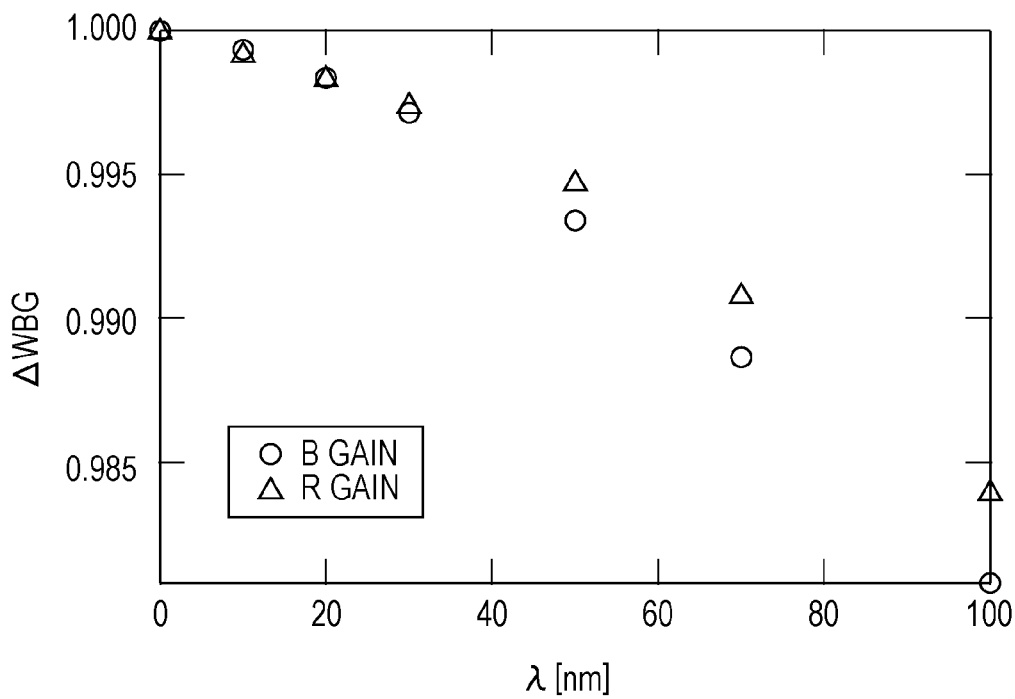
FIG. 14 illustrates the effect of the ratio between $\Delta OD_A$(460 nm) and $\Delta OD_A$(550 nm) and the ratio between $\Delta OD_A$(605 nm) and $\Delta OD_A$(510 nm) calculated at different wavelength range widths, on a change in white balance gain.

FIG. 14 illustrates the effect of the width of the wavelength range on the white balance gain change when the ratio between $\Delta OD_A(460$ nm) and $\Delta OD_A(550$ nm) and the ratio between $\Delta OD_A(605$ nm) and $\Delta OD_A(510$ nm) are calculated. Specifically, a wavelength region having a width in the wavelength direction centered on each of the wavelength (460, 550, 605, and 510 nm) used for the calculation of the ratio was specified. The $\Delta OD_A$ ratio was calculated using the average value of $\Delta OD_A$ in the wavelength region as the value of $\Delta OD_A$ in the wavelength region. As for other conditions, the same conditions as in FIG. 8 were used. The horizontal axis in FIG. 14 is the full width of the wavelength region in the wavelength direction (units: nm). The vertical axis indicates the effect on the white balance gain change and is normalized to 1 when the width is zero (a single point). The results indicate that when a full width of up to 30 nm is used, the effect on the white balance gain change is small, and the difference in effect between the types of white balance gain (B gain and R gain) is also small. Accordingly, the width of the wavelength region for calculating the $\Delta OD_A$ ratio to suppress the white balance gain change was set to 30 nm in full width.

Thus, for each of the R gain and the B gain, the ratio ($R_{W\Delta OD}$) between the average variable optical densities $\Delta OD_A$ in a full width of 30 nm centered on the wavelength with the greatest effect was used as an index. The effect of $R_{W\Delta OD}$ on the possibility of the occurrence of residual coloring when a charge imbalance occurs is evaluated using the white balance gain change ($\Delta WBG$).

Figure 15:
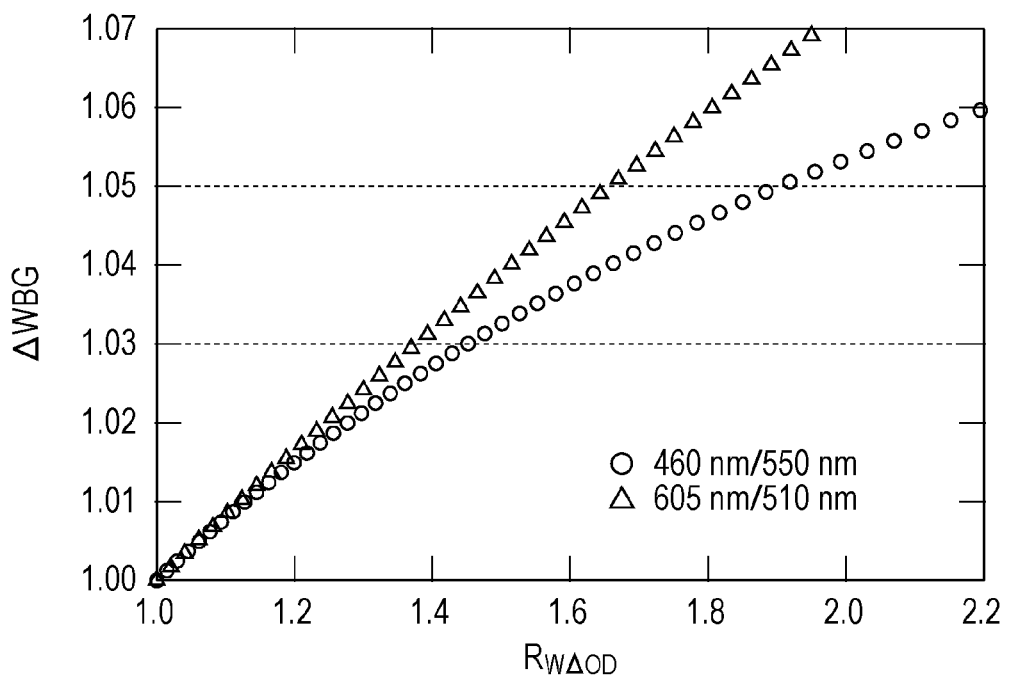
FIG. 15 illustrates the relationship between $\Delta WBG$ and $R_{W\Delta OD}$.

FIG. 15 is a graph illustrating the relationship between $\Delta WBG$ and $R_{W\Delta OD}$, where the vertical axis represents $\Delta WBG$, and the horizontal axis represents $R_{W\Delta OD}$. Here, $\Delta WBG$ and $R_{W\Delta OD}$ were simulated using the same conditions as for $R_{\Delta OD}$ described above, except that the average variable optical density was used. The results indicated that $\Delta WBG$ serving as an index of the charge imbalance-induced residual coloring increases with increasing $R_{W\Delta OD}$ and thus $R_{W\Delta OD}$ effectively functions as an index of the possibility of the occurrence of residual coloring when a charge imbalance occurs. In FIG. 15, "460 nm/550 nm" refers to the maximum value of the ratio between the average of $\Delta OD_A(445$ nm to 475 nm) and the average of $\Delta OD_A(535$ nm to 565 nm) and "605 nm/510 nm" refers to the maximum value of the ratio between the average of $\Delta OD_A(590$ nm to 620 nm) and the average of $\Delta OD_A(495$ nm to 525 nm). When the width of the wavelength region for calculating the $\Delta OD_A$ ratios is 30 nm, the effect of an EC compound having a sharp absorption spectrum with a narrow wavelength range can be stably evaluated on the white balance gain change. Moreover, it can be used as an effective evaluation index without deteriorating the specificity for RGB signals.

When the EC device according to an embodiment of the present disclosure is used as a unit (ND filter) configured to adjust the amount of light in the visible light region, the white balance gain change can be in the range of 5% or less, as described above. When the EC device according to an embodiment of the present disclosure is used as an advanced unit configured to adjust the amount of light, the white balance gain change can be in the range of 3% or less. From FIG. 15, preferably, $R_{W\Delta OD}$ is in the range of 1.90 or less for the maximum value of the ratio between the average of $\Delta OD_A(445$ nm to 475 nm) and the average of $\Delta OD_A(535$ nm to 565 nm) and 1.65 or less for the maximum value of the ratio between the average of $\Delta OD_A(590$ nm to 620 nm) and the average of $\Delta OD_A(495$ nm to 525 nm), where the white balance gain change is in the range of 5% or less. More preferably, $R_{W\Delta OD}$ is in the range of 1.45 or less for the maximum value of the ratio between the average of $\Delta OD_A$ (445 nm to 475 nm) and the average of $\Delta OD_A(535$ nm to 565 nm) and 1.37 or less for the maximum value of the ratio between the average of $\Delta OD_A(590$ nm to 620 nm) and the average of $\Delta OD_A(495$ nm to 525 nm), where the white balance gain change is in the range of 3% or less. Here, the maximum value of the ratio between $\Delta OD_{Am}(\lambda)$ and $\Delta OD_{An}(\lambda)$ is defined as $\Delta OD_{Am}(\lambda)/\Delta OD_{An}(\lambda)$ or $\Delta OD_{An}(\lambda)/\Delta OD_{Am}(\lambda)$, whichever is greater. In an embodiment of the present disclosure, it is possible to provide the EC device in which the anodic charge imbalance-induced residual coloring is suppressed by selecting the types and concentration ratios of anodic EC compounds so as to provide such $R_{W\Delta OD}$ values.

Regarding Advantageous Effects of the Present Disclosure

In the EC device according to an embodiment of the present disclosure, residual coloring is suppressed even when a charge imbalance occurs by bringing the colored state of the multiple anodic EC compounds closer to an achromatic color. Specifically, in the first aspect of the present disclosure, $RG_{max}$, which is described using the relationship between the spectra and the spectral sensitivity of the colored forms of the anodic EC compounds, is used as an index of the possibility of the occurrence of residual coloring when a charge imbalance occurs. The charge imbalance-induced residual coloring is suppressed by selecting the types and concentrations of the anodic EC compounds to keep this index within the predetermined range.

In the second aspect of the present disclosure, $R_{\Delta OD}$, which is described using the ratios between the variable optical densities at specific wavelengths in the spectra of the colored forms of the anodic EC compounds, is used as an index of the possibility of the occurrence of residual coloring when a charge imbalance occurs. The charge imbalance-induced residual coloring is suppressed by selecting the types and concentrations of the anodic EC compounds to keep this index within the predetermined range.

This can suppress the influence of changes in the optical characteristics of the EC device over time, and extend the usable time of the EC device. Examples of a method for extending the usable time of the EC device include, in addition to this method, the development of highly durable materials, the improvement of the device configuration including the improvement of the sealant, and the improvement of the driving method. While the method according to an embodiment of the present disclosure is different from these, it can be easily combined with the previously mentioned methods. This can effectively further extend the usable time of the EC device.

Optical Apparatus

The EC device according to an embodiment of the present disclosure can be used for optical apparatuses, such as optical filters, lens units, image pickup apparatuses, window members, and electrochromic mirrors.

Optical Filter

An optical filter according to an embodiment of the present disclosure includes an EC device according to an embodiment of the present disclosure and an active element coupled to the EC device. The active element is an active element configured to drive the EC device to adjust the amount of light passing through the EC device. An example of an active device is a transistor. The transistor may contain an oxide semiconductor, such as InGaZnO, in an active region.

Figure 9:
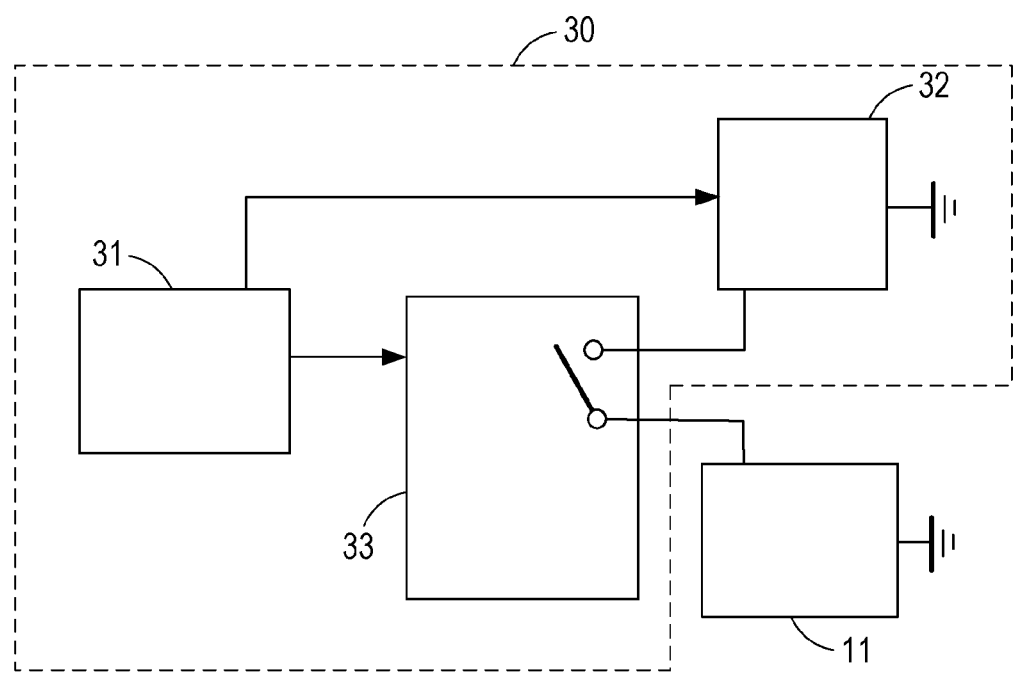
FIG. 9 illustrates a schematic configuration of an optical filter according to an embodiment.

The optical filter according to another embodiment of the present disclosure includes an EC device according to an embodiment of the present disclosure and a drive unit coupled to the EC device. FIG. 9 illustrates a schematic configuration of an optical filter including the EC device 11 and a drive unit 30 configured to drive the EC device 11. The drive unit 30 of the EC device 11 according to this embodiment includes a drive power supply 32, a resistor switch 33, and a controller 31.

The drive power supply 32 applies, to the EC device 11, a voltage needed to cause an EC material contained in the EC layer of the EC device 11 to undergo an electrochemical reaction. The drive voltage can be a constant voltage. This is because when the EC material contains several types of materials, the absorption spectrum may change because of the difference between the oxidation-reduction potentials or molar absorption coefficients of the materials. The start of the voltage application or the maintenance of the applied state of the drive power supply 32 is performed on the basis of a signal from the controller 31, and the applied state of the constant voltage is maintained during the period of controlling the light transmittance of the EC device 11.

As a method of controlling the transmittance of the EC device 11 with the controller 31, a method suitable for the EC device 11 used is employed. Specific examples thereof include a method in which predetermined conditions for a desired transmittance setting value are input to the EC device 11; and a method in which a transmittance setting value and the transmittance of the EC device 11 are compared, and conditions are selected and input to match the setting value. Examples of parameters to be varied include voltage, current, and a duty ratio. The controller 31 can change the color density of the EC device by varying the voltage, the current, or the duty ratio.

In this embodiment, known methods can be employed to change the voltage, change the current, and modulate the pulse width. The modulation of the pulse width can also be done as described below.

The resistor switch 33 switches between a resistor R1 and a resistor R2, which are not illustrated, having a higher resistance than the resistor R1 and connects the selected one of the resistors in series to a closed circuit including the drive power supply 32 and the EC device 11. The resistance value of the resistor R1 can be at least less than the maximum impedance of the element closed circuit and can be 10Ω or less. The resistance value of the resistor R2 can be higher than the maximum impedance of the element closed circuit and can be 1 MΩ or more. The resistor R2 may be air. In this case, strictly speaking, the closed circuit is an open circuit, but it can be considered as a closed circuit by regarding air as the resistor R2.

The controller 31 sends a switching signal to the resistor switch 33 to control the switching between the resistors R1 and R2. The controller 31 may generate a pulse width modulation (PWM) signal using, for example, a comparator without including the resistor switch 33.

Lens Unit

A lens unit according to an embodiment of the present disclosure includes an image pickup optical system including multiple lenses and the optical filter according to an embodiment of the present disclosure as described above. The optical filter may be disposed between the multiple lenses or outside the lenses. An optical filter can be disposed on the optical axis of the lenses.

Image Pickup Apparatus

An image pickup apparatus of the present disclosure includes the optical filter according to an embodiment of the present disclosure described above and a light-receiving device configured to receive light passed through the optical filter. Specific examples of the image pickup apparatus include cameras, camcorders, and mobile phones equipped with cameras. The image pickup apparatus may be in a form in which a main body including a light-receiving device and a lens unit including a lens are separable from each other. When the image pickup apparatus is separable into the main body and the lens unit, a form in which an optical filter separated from the image pickup apparatus is used during image pickup is also included in an embodiment of the present disclosure. In this case, the optical filter is disposed, for example, outside the lens unit, between the lens unit and the light-receiving device, or between multiple lenses (in the case of the lens unit including the multiple lenses).

Figure 10A:
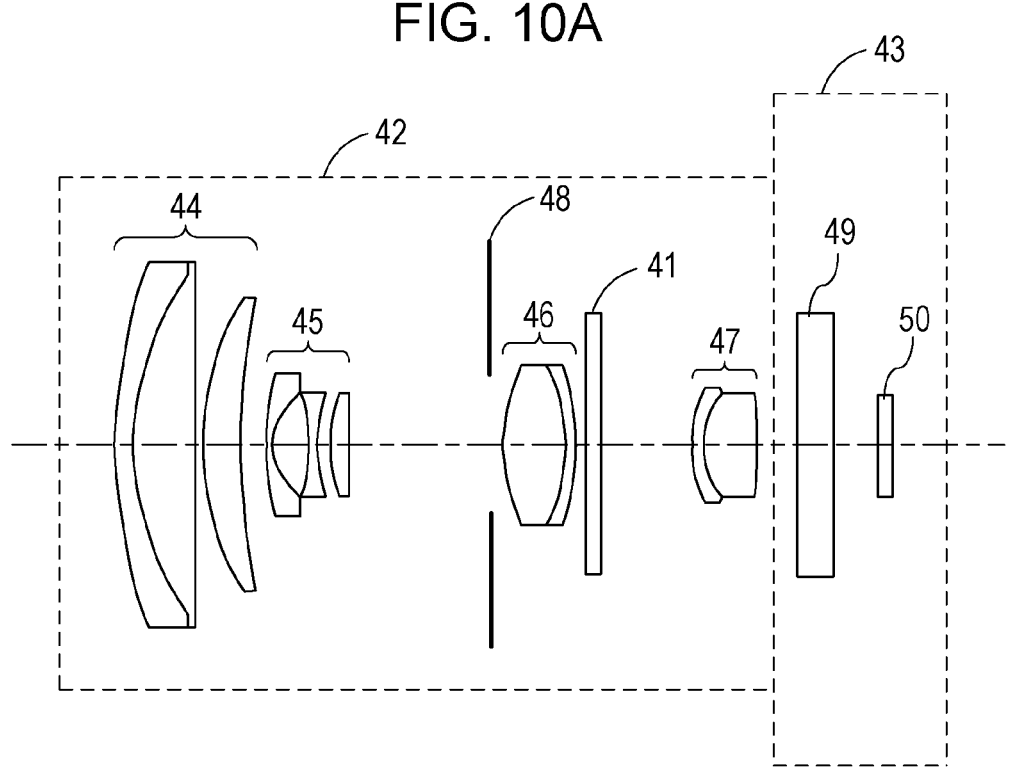
FIGS. 10A and 10B are each a schematic view illustrating the structure of an image pickup apparatus according to an embodiment.
Figure 10B:
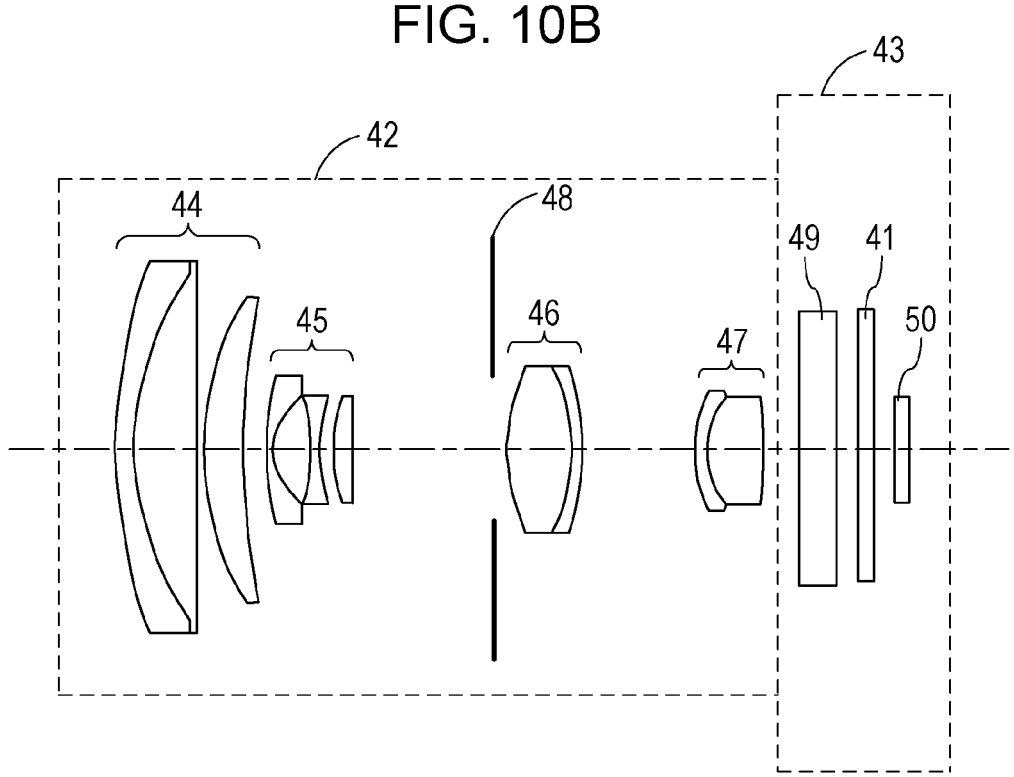

FIG. 10A is a schematic diagram illustrating an example of an image pickup apparatus in which an optical filter is disposed in a lens unit. FIG. 10B is a schematic diagram illustrating an example of an image pickup apparatus in which an optical filter is disposed in an image pickup unit.

The image pickup apparatuses illustrated in FIGS. 10A and 10B are each an image pickup apparatus including a lens unit 42 and an image pickup unit 43. The lens unit 42 includes an optical filter 41 and an image pickup optical system including multiple lenses or lens groups. The optical filter 41 is the above-described optical filter according to an embodiment of the present disclosure.

In FIG. 10A, for example, the lens unit 42 represents a rear-focusing zoom lens that performs focusing behind the diaphragm. The lens unit 42 includes four lens groups in order from the photographic subject side: a first lens group 44 having a positive refractive power, a second lens group 45 having a negative refractive power, a third lens group 46 having a positive refractive power, and a fourth lens group 47 having a positive refractive power. Zooming is performed by changing the distance between the second lens group 45 and the third lens group 46. Focusing is performed by moving some lenses of the fourth lens group 47.

The lens unit 42 includes an aperture diaphragm 48 between the second lens group 45 and the third lens group 46 and includes an optical filter 41 between the third lens group 46 and the fourth lens group 47. The lens unit 42 is configured in such a manner that light passing through the lens unit passes through each of the lens groups 44 to 47, the diaphragm 48, and the optical filter 41. Thus, the amount of light can be adjusted with the aperture diaphragm 48 and the optical filter 41.

The lens unit 42 is detachably connected to the image pickup unit 43 with a mount member (not illustrated) interposed therebetween.

In this embodiment, the optical filter 41 is disposed between the third lens group 46 and the fourth lens group 47 in the lens unit 42. However, the image pickup apparatus is not limited to this configuration.

For example, the optical filter 41 may be in front of (on the photographic subject side) or behind (on the image pickup unit 43 side) the aperture diaphragm 48, or may be in front of, behind, or between the first to fourth lens groups 44 to 47. When the optical filter 41 is disposed at a position where light converges, for example, the optical filter 41 can advantageously have a smaller area.

The configuration of the lens unit 42 is not limited to the above-described configuration and may be selected as appropriate. For example, in addition to the rear-focus configuration, an inner-focus configuration, in which focusing is performed before a diaphragm, is also acceptable, and other configurations are also acceptable. In addition to such zoom lenses, special lenses, such as fisheye lenses and macro lenses, can be selected as appropriate.

The image pickup unit 43 includes a glass block 49 and a light-receiving device 50. The glass block 49 is a glass block, such as a low-pass filter, a face plate, or a color filter. The light-receiving device 50 is a sensor part that receives light passed through the lens unit, and an image pickup device, such as a charge-coupled device (CCD) or a complementary metal-oxide semiconductor (CMOS) can be used. A photosensor, such as a photodiode, may also be used. A component configured to acquire and output information on the intensity or wavelength of light can be used as appropriate.

As illustrated in FIG. 10A, when the optical filter 41 is included in the lens unit 42, the drive unit for the EC device (not illustrated) may be disposed inside the lens unit 42 or may be disposed outside the lens unit 42. When the drive unit is disposed outside the lens unit 42, the EC device in the lens unit 42 is connected to the drive unit through a conductive line, and drive control is performed.

In the configuration of the image pickup device described above, the optical filter 41 is disposed inside the lens unit 42. However, the disclosure is not limited to this configuration. It is sufficient that the optical filter 41 is disposed at an appropriate position inside the image pickup device, and that the light-receiving device 50 is disposed so as to receive light passed through the optical filter 41.

For example, as illustrated in FIG. 10B, the image pickup unit 43 may include the optical filter 41. FIG. 10B illustrates another example of an image pickup apparatus according to an embodiment of the present disclosure, and is a schematic diagram illustrating the configuration of the image pickup apparatus including the optical filter 41 in the image pickup unit 43. In FIG. 10B, for example, the optical filter 41 is disposed immediately in front of the light-receiving device 50. When the image pickup unit itself contains the optical filter 41, the lens unit 42 to be connected need not contain the optical filter 41; thus, an image pickup apparatus capable of modulating light can be configured with the existing lens unit 42.

The image pickup apparatus according to an embodiment of the present disclosure is applicable to products including a combination of the adjustment of the amount of light and a light-receiving device. The image pickup apparatus is applicable to, for example, cameras, digital cameras, camcorders, and digital camcorders. In addition, the image pickup apparatus is applicable to products with a built-in image pickup apparatuses, for example, mobile phones, smart phones, personal computers, and tablets.

According to the image pickup apparatus according to an embodiment of the present disclosure, when the optical filter is used as a light-modulating member, the amount of light modulated can be changed by a single filter, which is advantageous in reducing the number of components and saving space.

Window Member

A window member according to an embodiment of the present disclosure includes the EC device according to an embodiment of the present disclosure and an active element coupled to the EC device. The active element is an active element that drives the EC device and adjusts the amount of light passing through the EC device. The active element is, for example, a transistor. The transistor may contain an oxide semiconductor, such as InGaZnO, in an active region. A window according to this embodiment can also be referred to as a variable transmittance window.

Figure 11A:
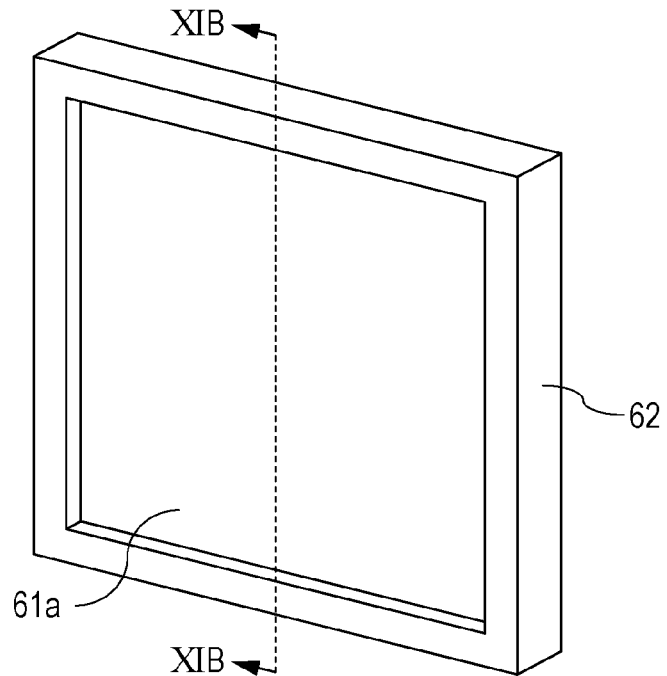
FIGS. 11A and 11B are each a schematic view illustrating the structure of a window member.
Figure 11B:
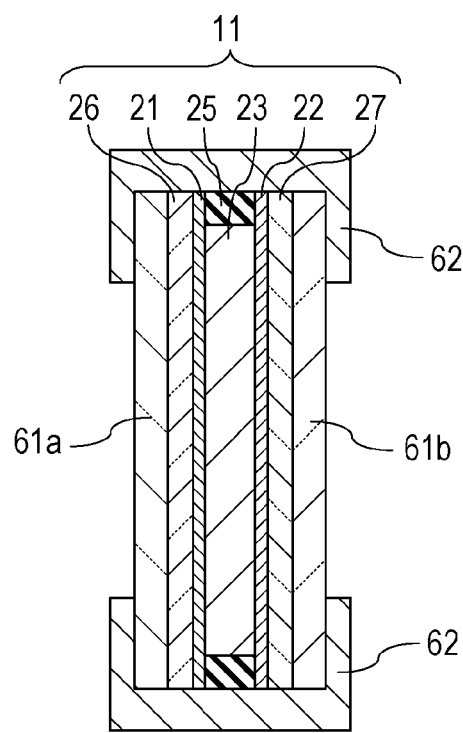

FIG. 11A is a graphical overview of a light-modulating window as a window member including an EC device according to an embodiment of the present disclosure. FIG. 11B is a schematic cross-sectional view taken along line XIB-XIB of FIG. 11A. The light-modulating window according to this embodiment includes the EC device 11, transparent sheets 61a and 61b sandwiching the EC device 11, and a frame 62 that surrounds and integrates the entirety. The EC device 11 includes a drive unit (not illustrated). The drive unit may be disposed in the frame 62 in an integrated form or may be disposed outside the frame 62 and coupled to the EC device 11 through a conductive line.

The transparent sheets 61a and 61b can be composed of any material having high light transmittance, and can be composed of a glass material in consideration of use for a window. The frame 62 can be composed of any material. Any member covering at least part of the EC device 11 in an integrated form may be regarded as a frame. In FIG. 11, the EC device 11 is a constituent member independent of the transparent sheets 61a and 61b. For example, the transparent substrates 26 and 27 of the EC element 11 may be regarded as the transparent sheets 61a and 61b.

The light-modulating window can be used for adjusting the amount of sunlight entering a room during the day, for example. The light-modulating window can be used to adjust the amount of heat as well as the amount of sunlight, and thus can be used to control the brightness and temperature of the room. The light-modulating window can also be used as a shutter to block the view from outside to inside the room. The light-modulating window can also be used for windows of vehicles, such as automobiles, electric trains, airplanes, and ships, in addition to glass windows for buildings.

As described above, the EC device according to an embodiment of the present disclosure can be used for, for example, the optical filter, the lens unit, the image pickup apparatus, and the window member.

An electrochromic mirror (EC mirror) can be produced by attaching a reflective member to one side of the EC device in the optical path. The EC mirror may be installed in an automobile as an anti-glare mirror. The EC mirror can include the EC device according to an embodiment of the present disclosure and a reflective member disposed inside or outside the EC device. The fact that the EC device includes the reflective member inside indicates that one of the electrodes of the EC device is reflective. The fact that the EC device includes the reflective member outside indicates that the reflective member is in contact with the transparent electrode of the EC device or is disposed with another transparent member provided therebetween.

EXAMPLES

While the present disclosure will be described in more detail below by examples, the present disclosure is not limited to these examples.

Specific examples of anodic EC compounds and cathodic EC compounds used in Examples are given below. However, EC compounds used in the present disclosure are not limited thereto. EC compounds (2), (4), and (5) are anodic EC compounds and are dihydrophenazine derivatives, which are aromatic amine derivatives, and were synthesized by a method described in International Publication No. 2020/121845. EC compounds (6) to (9) are cathodic EC compounds and are viologen derivatives, which are pyridine derivatives. The EC compounds (6) and (7) were synthesized by a method described in International Publication No. 2020/121845. The EC compounds (8) and (9) were synthesized with reference to methods described in Japanese Patent Laid-Open Nos. 2016-155802 and 2017-021327, respectively.

(2)

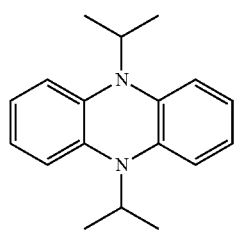

-continued (4)

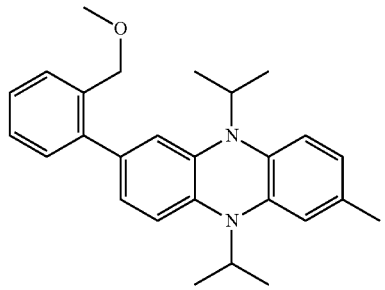

(5)

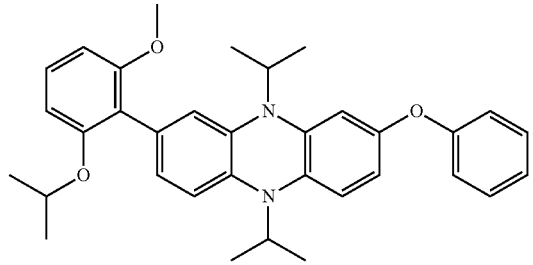

(6)

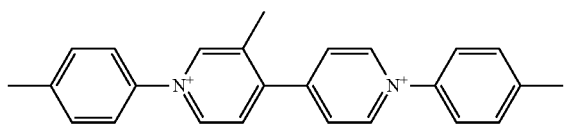

(7)

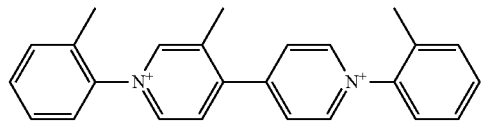

(8)

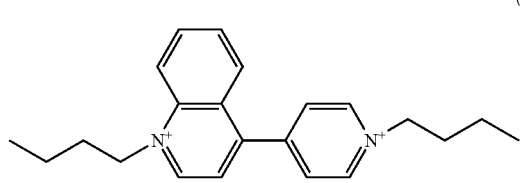

(9)

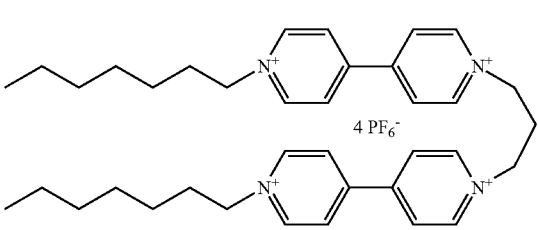

Production of EC Device

An EC device having the configuration illustrated in FIG. 2 was produced by the following process.

(1) Production of EC-Device Structure

Two transparent conductive glass sheets each including an indium-doped tin oxide (ITO) film formed thereon were provided. A thermosetting epoxy-based adhesive mixed with 30-μm spacer beads was used as the sealant 25 and applied to the periphery of each of the transparent conductive glass sheets. The two transparent conductive glass sheets were placed on top of each other with the ITO films (first electrode 21 and second electrode 22) facing each other. Then the adhesive was cured by heating, thereby bonding the sheets serving as the substrates 26 and 27. A portion where no sealant was applied was formed and used as an inlet.

(2) Injection of Electrolytic Solution

Figure 12B:
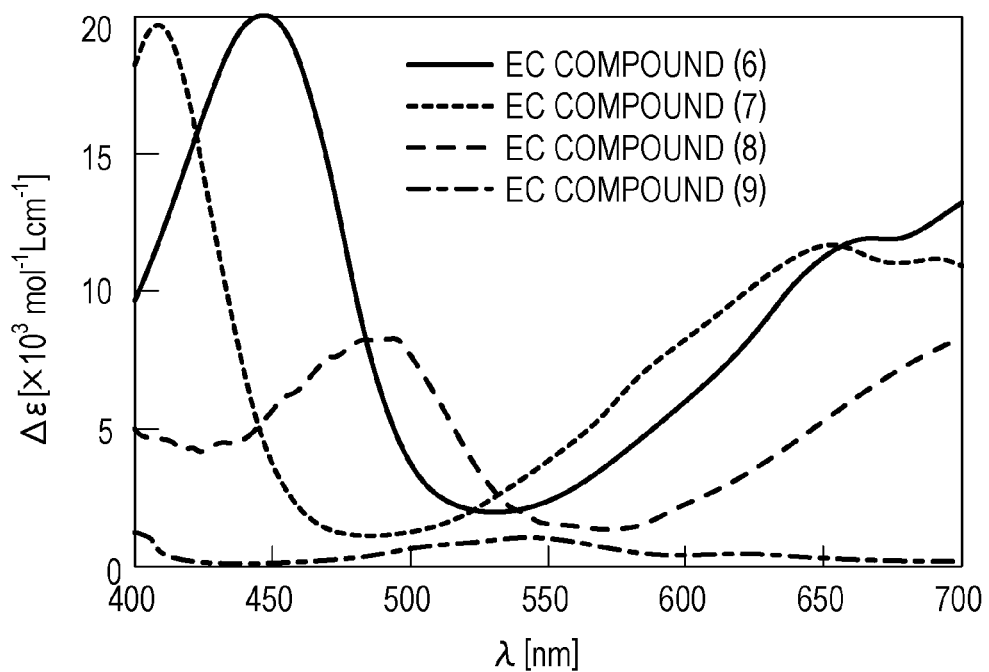

The anodic EC compounds and the cathodic EC compounds were dissolved in a 10% by weight solution of poly(methyl methacrylate) in propylene carbonate in such a manner that the concentrations (units:mmol/L) thereof in the light reduction state were those listed in Table 1. Modified molar absorption coefficients Δε (differences obtained by subtracting molar absorption coefficients in decolored forms from molar absorption coefficients in colored forms) were illustrated in FIG. 12A for the EC compounds (2), (4), and (5) and in FIG. 12B for the EC compounds (6) to (9). In this solution, the three EC compounds (2), (4), and (5) were anodic EC compounds and had spectral peaks in their colored forms in the B, G, and R regions, respectively, of the target image pickup device having the spectral sensitivity illustrated in FIG. 4A.

TABLE 1

| | EC compound | | | | | | |
|---|---|---|---|---|---|---|---|
| | (2) | (4) | (5) | (6) | (7) | (8) | (9) |
| Example 1 | 29.2 | 10.7 | 32.4 | 7.0 | 39.9 | 2.4 | 18.0 |
| Example 2 | 22.2 | 23.4 | 24.5 | 7.0 | 39.9 | 2.4 | 18.0 |
| Comparative example 1 | 13.2 | 39.6 | 14.4 | 7.0 | 39.9 | 2.4 | 18.0 |
| Comparative example 2 | 6.9 | 51.2 | 7.2 | 7.0 | 39.9 | 2.4 | 18.0 |

Each electrolytic solution containing the EC compounds was injected into the EC-device structure through the inlet. The EC-device structure was then sealed with the thermosetting epoxy-based adhesive described above to produce an EC device. The average value of the effective maximum variable optical density ($\Delta OD_{max}$) of the EC device was about 1.8 (ND 64) in a wavelength range of 425 nm to 680 nm.

Figure 13:
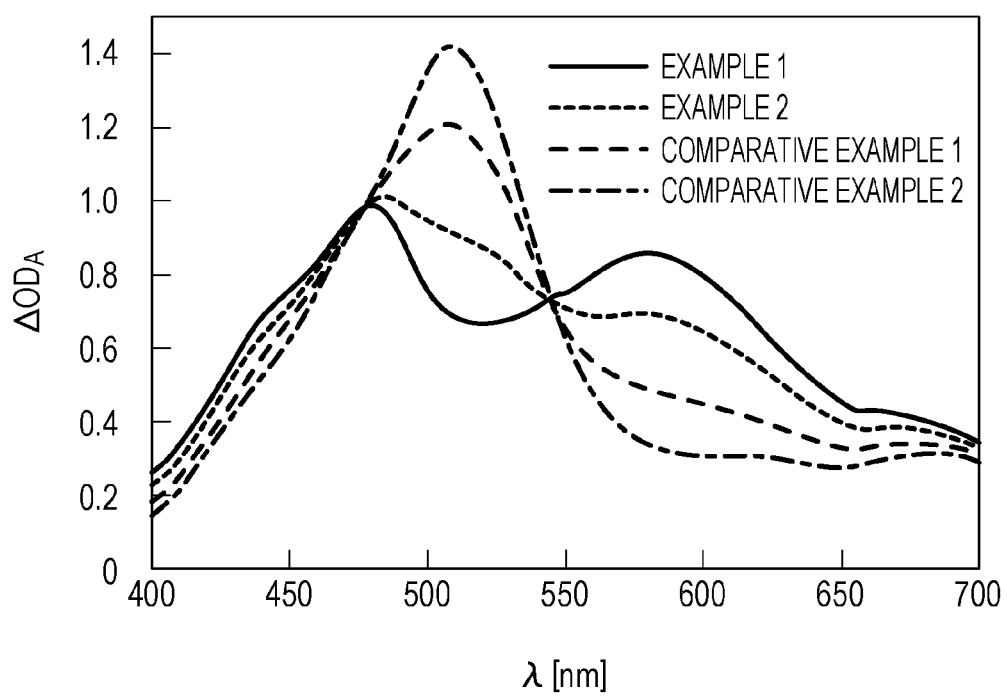
FIG. 13 illustrates variable optical density spectra of anodic EC compounds of Examples and Comparative examples.

FIG. 13 illustrates variable optical density ($\Delta OD_A$) spectra of the anodic EC compounds of Examples and Comparative examples. Table 2 presents a list of $RG_{max}$, $R_{\Delta OD}$ ($\Delta OD_A$ ratio), and $R_{W\Delta OD}$ (ratio of average of $\Delta OD_A$ with a wavelength range width), which are calculated from the spectra and are indices of the possibility of the occurrence of residual coloring when a charge imbalance occurs.

FIG. 13 indicates that the $\Delta OD_A$ spectra of the anodic EC compounds of Examples are broader in wavelength than those of Comparative examples. In contrast, the $\Delta OD_A$ spectra of the anodic EC compounds of Comparative examples 1 and 2 indicate that the absorption is relatively concentrated at about 500 nm, as is often the case with colored forms of typical dihydrophenazine derivatives. As a result, the values of $RG_{max}$ were 1.21 or less for Example 1 and 1.37 or less for Example 2. In contrast, the values of $RG_{max}$ of Comparative examples 1 and 2 were larger than 1.37.

Regarding $R_{\Delta OD}$ ($\Delta OD_A$ ratio), the ratio between $\Delta OD_A$(460 nm) and $\Delta OD_A$(550 nm) was 1.44 or less in each of Examples and Comparative examples. The ratio between $\Delta OD_A$(605 nm) and $\Delta OD_A$(510 nm) was 1.41 or less in Example 1, and 1.72 or less in Example 2. In contrast, in each of Comparative examples 1 and 2, the value was more than 1.72.

Regarding $R_{W\Delta OD}$ (ratio of average $\Delta OD_A$ with wavelength range width), the ratio between $\Delta OD_A$(445 nm to 475 nm, average) and $\Delta OD_A$(535 nm to 565 nm, average) was 1.45 or less in each of Examples and Comparative examples. The ratio between $\Delta OD_A$(590 nm to 620 nm, average) and $\Delta OD_A$(495 nm to 525 nm, average) was 1.37 or less in Example 1, and 1.65 or less in Example 2. In contrast, in each of Comparative examples 1 and 2, the value was more than 1.65.

(3) Durability Driving of EC Device and White Balance Gain Change

In a constant-temperature and constant-humidity chamber maintained at 60° C. and 90% RH, a voltage of 0.7 V was applied across the first electrode and the second electrode of the EC device to bring the EC device into a colored state. After a lapse of 500 hours, the first electrode and the second electrode were short-circuited to bring the EC device into a decolored state. The EC device was found to have residual coloring mainly due to the absorption of the anodic EC compounds. The white balance gain change (ΔWBG) based on the white balance gain of the EC device in the decolored state before the durability test was measured using the optical apparatus illustrated in FIG. 1, the optical apparatus including the image pickup device having the spectral sensitivity illustrated in FIG. 4A, natural light during the daytime being used as a light source. Table 3 presents the maximum values of the white balance gain change.

TABLE 3

| | Example 1 | Example 2 | Comparative example 1 | Comparative example 2 |
|---|---|---|---|---|
| ΔWBG | 1.010 | 1.036 | 1.069 | 1.092 |

TABLE 2

| | Example 1 | Example 2 | Comparative example 1 | Comparative example 2 |
|---|---|---|---|---|
| $RG_{max}$ | 1.08 | 1.26 | 1.50 | 1.66 |
| $\Delta OD_A$(460, 550 nm) ratio | 1.11 | 1.14 | 1.19 | 1.23 |
| $\Delta OD_A$(510, 605 nm) ratio | 1.12 | 1.47 | 2.76 | 4.63 |
| $R_{W\Delta OD}$(445 nm to 475 nm, average, 535 nm to 565 nm, average) ratio | 1.12 | 1.13 | 1.15 | 1.16 |
| $R_{W\Delta OD}$(590 nm to 620 nm, average, 495 nm to 525 nm, average) ratio | 1.07 | 1.47 | 2.66 | 4.35 |

The maximum value of the white balance gain change was 1.0% in Example 1 and 3.6% in Example 2. The results confirmed that in the optical apparatus including the EC device of Example 1, the charge imbalance-induced residual coloring in the durability test was at a level that was unlikely to be perceived. We also confirmed that in the optical apparatus including the EC device of Example 2, the charge imbalance-induced residual coloring in the durability test was at a level that was not clearly perceived. In contrast, the maximum value of the white balance gain change in each of Comparative examples 1 and 2 was more than 5%. The results confirmed that in each of the optical apparatuses including the EC devices of Comparative examples 1 and 2, the charge imbalance-induced residual coloring in the durability test was at a level that was clearly perceived.

From these examples, we confirmed the following effects.

(A) $RG_{max}$, which is the index of the possibility of occurrence of the charge imbalance-induced residual coloring, is used to select the types and concentrations of the anodic EC compounds of the low-molecular-weight organic compounds in such a manner that the variable optical density spectrum is 1.21 or less. This enables the charge imbalance-induced residual coloring that occurs in the durability test to be at a level that is unlikely to be perceived. Similarly, selecting the types and concentrations of the anodic EC compounds in such a manner that $RG_{max}$ is 1.37 or less enables the charge imbalance-induced residual coloring in the durability test to be at a level that is not clearly perceived.

(B) The ratios between the variable optical densities of the anodic EC compounds at specific wavelengths, which are simple indices of the possibility of the charge imbalance-induced residual coloring, are used to select the types and concentrations of the anodic EC compounds of the low-molecular-weight organic compounds. The maximum value of the ratio between $\Delta OD_A(460\ nm)$ and $\Delta OD_A(550\ nm)$ is 1.44 or less, and the maximum value of the ratio between $\Delta OD_A(605\ nm)$ and $\Delta OD_A(510\ nm)$ is 1.41 or less. This enables the charge imbalance-induced residual coloring that occurs in the durability test to be at a level that is unlikely to be perceived. The maximum value of the ratio between $\Delta OD_A(460\ nm)$ and $\Delta OD_A(550\ nm)$ is 1.90 or less, and the maximum value of the ratio between $\Delta OD_A(605\ nm)$ and $\Delta OD_A(510\ nm)$ is 1.72 or less. This enables the charge imbalance-induced residual coloring that occurs in the durability test to be at a level that is not clearly perceived.

(C) The ratios between the average variable optical densities of the anodic EC compounds in specific wavelength ranges, which are simple indices of the possibility of the charge imbalance-induced residual coloring, are used to select the types and concentrations of the anodic EC compounds of the low-molecular-weight organic compounds. The maximum value of the ratio between $\Delta OD_A(445\ nm\ to\ 475\ nm, average)$ and $\Delta OD_A(535\ nm\ to\ 565\ nm, average)$ is 1.45 or less, and the maximum value of the ratio between $\Delta OD_A(590\ nm\ to\ 620\ nm, average)$ and $\Delta OD_A(495\ nm\ to\ 525\ nm, average)$ is 1.37 or less. This enables the charge imbalance-induced residual coloring that occurs in the durability test to be at a level that is unlikely to be perceived. The maximum value of the ratio between $\Delta OD_A(445\ nm\ to\ 475\ nm, average)$ and $\Delta OD_A(535\ nm\ to\ 565\ nm, average)$ is 1.90 or less, and the maximum value of the ratio between $\Delta OD_A(590\ nm\ to\ 620\ nm, average)$ and $\Delta OD_A(495\ nm\ to\ 525\ nm, average)$ is 1.65 or less. This enables the charge imbalance-induced residual coloring that occurs in the durability test to be at a level that is not clearly perceived.

According to an embodiment of the present disclosure, it is possible to provide an EC device in which the anodic charge imbalance-induced residual coloring is suppressed without using a redox buffer. It is thus possible to provide various optical apparatuses having superior transmittance control characteristics without causing an increase in power consumption or a deterioration in response time.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-212459 filed Dec. 22, 2020 and No. 2021-174640 filed Oct. 26, 2021, which are hereby incorporated by reference herein in their entirety.

What is claimed is:

1. An electrochromic device, comprising:
    a first electrode;
    a second electrode;
    an electrochromic layer disposed between the first electrode and the second electrode, the electrochromic layer containing multiple anodic electrochromic compounds of low-molecular-weight organic compounds and a cathodic redox substance,
    wherein the electrochromic device is intended for a photodetector having multiple detection light wavelength regions, and
    $RG_{max}$ is 1.37 or less, wherein $RG_{max}$ is a maximum value among ratios between red-green-blue (RGB) signal ratios in a transmission state of the electrochromic device and in colored states of the multiple anodic electrochromic compounds, the RGB signal ratios are obtained from $T_A(\lambda)$ and sensitivity of the photodetector, and $T_A(\lambda)$ is a normalized variable transmittance obtained by a combination of absorptions of the multiple anodic electrochromic compounds.

2. The electrochromic device according to claim 1, wherein $RG_{max}$ is 1.21 or less.

3. The electrochromic device according to claim 1, wherein $T_A(\lambda)$ is represented by a formula described below:

$$T_A(\lambda) = 10^{-\Delta OD_{Aave}(\lambda)}$$

where $\Delta OD_{Aave}(\lambda)$ is an extent of contribution of colored forms of the anodic electrochromic compounds in a normalized variable optical density $\Delta OD_{ave}$ obtained by normalizing $\Delta OD_{max}$ using B,
B is an average variable optical density in an effective wavelength region of the photodetector, and
$\Delta OD_{max}$ is an effective maximum variable optical density of the electrochromic device.

4. The electrochromic device according to claim 1, wherein $RG_{max}$ is a maximum value among $G_{RI}/G_{RT}$, $G_{RT}/G_{RI}$, $G_{BI}/G_{BT}$, and $G_{BT}/G_{BI}$,
where $$G_{RI} = S_{GI}/S_{RI},$$

$$G_{RT} = S_{GT}/S_{RT},$$

$$G_{BI} = S_{GI}/S_{BI},$$

$$G_{BT} = S_{GT}/S_{BT},$$

$S_{RT}$ is a detected signal intensity of light transmitted through the electrochromic device in the transmission state and detected by the photodetector in a red wavelength region, $S_{GT}$ is a detected signal intensity of light transmitted through the electrochromic device in the transmission state and detected by the photodetector in a green wavelength region, $S_{BT}$ is a detected signal intensity of light transmitted through the electrochromic device in the transmission state and detected by the photodetector in a blue wavelength region, $S_{RI}$ is a detected signal intensity of light transmitted through the anodic electrochromic compounds in the colored states and detected by the photodetector in the red wavelength region, $S_{GI}$ is a detected signal intensity of light transmitted through the anodic electrochromic compounds in the colored states and detected by the photodetector in the green wavelength region, and $S_{BI}$ is a detected signal intensity of light transmitted through the anodic electrochromic compounds in the colored states and detected by the photodetector in the blue wavelength region.

5. The electrochromic device according to claim 1, wherein the multiple anodic electrochromic compounds have a variable optical density spectrum peak in each one of the multiple detection light wavelength regions of the photodetector.

6. The electrochromic device according to claim 1, wherein the anodic electrochromic compounds comprises a dihydrophenazine derivative.

7. The electrochromic device according to claim 1, wherein three or more types of the anodic electrochromic compounds are used.

8. The electrochromic device according to claim 1, wherein a maximum light reduction ratio of the transmission state to a light reduction state (transmission state/light reduction state) during normal use of the electrochromic device is 8 or more.

9. The electrochromic device according to claim 8, wherein the light reduction ratio is 32.

10. An optical filter, comprising:
the electrochromic device according to claim 1 and an active element coupled to the electrochromic device.

11. An optical filter, comprising:
the electrochromic device according to claim 1 and a drive unit configured to drive the electrochromic device.

12. A lens unit, comprising:
the optical filter according to claim 10 and an image pickup optical system including multiple lenses.

13. An image pickup apparatus, comprising:
the optical filter according to claim 10 and a light-receiving device configured to receive light passed through the optical filter.

14. A window member, comprising:
the electrochromic device according to claim 1 and an active element coupled to the electrochromic device.

15. An electrochromic mirror, comprising:
the electrochromic device according to claim 1 and a reflective member disposed inside or outside the electrochromic device.

16. An electrochromic device, comprising:
a first electrode;
a second electrode;
an electrochromic layer disposed between the first electrode and the second electrode, the electrochromic layer containing multiple anodic electrochromic compounds of low-molecular-weight organic compounds and a cathodic redox substance,
wherein when a variable optical density of the anodic electrochromic compounds is defined as $\Delta OD_A(\lambda)$,
a maximum value of a ratio between $\Delta OD_A(460 \text{ nm})$ and $\Delta OD_A(550 \text{ nm})$ is 1.90 or less, and
a maximum value of a ratio between $\Delta OD_A(605 \text{ nm})$ and $\Delta OD_A(510 \text{ nm})$ is 1.72 or less.

17. The electrochromic device according to claim 16, wherein the maximum value of the ratio between $\Delta OD_A(460 \text{ nm})$ and $\Delta OD_A(550 \text{ nm})$ is 1.44 or less, and
the maximum value of the ratio between $\Delta OD_A(605 \text{ nm})$ and $\Delta OD_A(510 \text{ nm})$ is 1.41 or less.

18. An electrochromic device, comprising:
a first electrode;
a second electrode;
an electrochromic layer disposed between the first electrode and the second electrode, the electrochromic layer containing multiple anodic electrochromic compounds of low-molecular-weight organic compounds and a cathodic redox substance,
wherein when a variable optical density of the anodic electrochromic compounds is defined as $\Delta OD_A(\lambda)$,
a maximum value of a ratio between an average of $\Delta OD_A(445 \text{ nm to } 475 \text{ nm})$ and an average of $\Delta OD_A(535 \text{ nm to } 565 \text{ nm})$ is 1.90 or less, and a maximum value of a ratio between an average of $\Delta OD_A(590 \text{ nm to } 620 \text{ nm})$ and an average of $\Delta OD_A(495 \text{ nm to } 525 \text{ nm})$ is 1.65 or less.

19. The electrochromic device according to claim 18, wherein the maximum value of the ratio between the average of $\Delta OD_A(445 \text{ nm to } 475 \text{ nm})$ and the average of $\Delta OD_A(535 \text{ nm to } 565 \text{ nm})$ is 1.45 or less, and
the maximum value of the ratio between the average of $\Delta OD_A(590 \text{ nm to } 620 \text{ nm})$ and the average of $\Delta OD_A(495 \text{ nm to } 525 \text{ nm})$ is 1.37 or less.

* * * * *